United States Patent
Hoerenz

(10) Patent No.: US 8,321,267 B2
(45) Date of Patent: Nov. 27, 2012

(54) METHOD, SYSTEM AND APPARATUS FOR TARGETING AN OFFER

(75) Inventor: Chris P. Hoerenz, Scarsdale, NY (US)

(73) Assignee: Mindspark Interactive Network, Inc., New York, NY (US)

( * ) Notice: Subject to any disclaimer, the term of this patent is extended or adjusted under 35 U.S.C. 154(b) by 1690 days.

(21) Appl. No.: 10/610,308

(22) Filed: Jun. 30, 2003

(65) Prior Publication Data

US 2004/0267611 A1 Dec. 30, 2004

(51) Int. Cl.
*G06Q 30/00* (2012.01)

(52) U.S. Cl. .................................................. 705/14.1

(58) Field of Classification Search ............. 705/14, 705/14.1
See application file for complete search history.

(56) References Cited

U.S. PATENT DOCUMENTS

| | | | |
|---|---|---|---|
| 5,105,184 A | 4/1992 | Pirani et al. | |
| 5,305,195 A | 4/1994 | Murphy | |
| 5,446,919 A | 8/1995 | Wilkins | |
| 5,515,098 A | 5/1996 | Carles | |
| 5,572,643 A | 11/1996 | Judson | |
| 5,636,346 A | 6/1997 | Saxe | |
| 5,717,923 A | 2/1998 | Dedrick | |
| 5,724,424 A | 3/1998 | Gifford | |
| 5,724,521 A * | 3/1998 | Dedrick | 705/26 |
| 5,737,619 A | 4/1998 | Judson | |
| 5,740,549 A | 4/1998 | Reilly et al. | |
| 5,768,521 A | 6/1998 | Dedrick | |
| 5,774,170 A | 6/1998 | Hite et al. | |
| 5,794,210 A | 8/1998 | Goldhaber et al. | |
| 5,809,242 A | 9/1998 | Shaw et al. | |
| 5,848,396 A | 12/1998 | Gerace | |
| 5,848,397 A | 12/1998 | Marsh et al. | |
| 5,918,014 A | 6/1999 | Robinson | |
| 5,933,811 A | 8/1999 | Angles et al. | |
| 5,937,392 A | 8/1999 | Alberts | |
| 5,946,646 A | 8/1999 | Schena et al. | |
| 5,948,061 A | 9/1999 | Merriman et al. | |
| 5,959,623 A | 9/1999 | van Hoff et al. | |
| 5,983,199 A | 11/1999 | Kaneko | |
| 5,983,227 A | 11/1999 | Nazem et al. | |
| 5,996,006 A | 11/1999 | Speicher | |
| 6,006,197 A | 12/1999 | d'Eon et al. | |
| 6,026,368 A | 2/2000 | Brown et al. | |
| 6,052,122 A | 4/2000 | Sutcliffe et al. | |
| 6,064,967 A | 5/2000 | Speicher | |
| 6,073,105 A | 6/2000 | Sutcliffe et al. | |
| 6,128,651 A | 10/2000 | Cezar | |
| 6,128,663 A | 10/2000 | Thomas | |
| 6,157,946 A | 12/2000 | Itakura et al. | |
| 6,161,127 A | 12/2000 | Cezar et al. | |

(Continued)

FOREIGN PATENT DOCUMENTS

WO    WO 01/85273 A1    11/2001

*Primary Examiner* — Daniel Lastra

(74) *Attorney, Agent, or Firm* — SNR Denton US LLP

(57) ABSTRACT

A system, apparatus, means, computer code, and method may include receiving data indicative of information associated with a user, determining a value of a metric associated with the user based on the data indicative of information associated with the user, verifying that the value of the metric associated with the user is valid, selecting an offer from a plurality of offers where each of the offers has a score associated with the value of the metric, and providing data indicative of the selected offer.

36 Claims, 12 Drawing Sheets

U.S. PATENT DOCUMENTS

| | | |
|---|---|---|
| 6,205,432 B1 | 3/2001 | Gabbard et al. |
| 6,216,129 B1 | 4/2001 | Eldering |
| 6,271,843 B1 | 8/2001 | Lection et al. |
| 6,285,987 B1 | 9/2001 | Roth et al. |
| 6,321,256 B1 | 11/2001 | Himmel et al. |
| 6,330,566 B1 | 12/2001 | Durham |
| 6,357,042 B2 | 3/2002 | Srinivasan et al. |
| 6,401,075 B1 | 6/2002 | Mason et al. |
| 6,442,577 B1 | 8/2002 | Britton et al. |
| 6,454,650 B1 | 9/2002 | Aronin |
| 6,560,578 B2 | 5/2003 | Eldering |
| 2001/0051901 A1* | 12/2001 | Hager et al. ............ 705/26 |
| 2002/0120507 A1 | 8/2002 | Chanos et al. |
| 2003/0004810 A1 | 1/2003 | Eldering |
| 2003/0009368 A1 | 1/2003 | Kitts |
| 2003/0023489 A1 | 1/2003 | McGuire et al. |
| 2003/0208754 A1* | 11/2003 | Sridhar et al. ............ 725/34 |
| 2008/0235083 A2* | 9/2008 | Bosarge et al. ............ 705/14 |

* cited by examiner

300

| ZIP+4 302 | UNIVERSAL MODEL RANK 304 | "BILL ME" RANK 306 | VIDEO OFFERS PROBABILITY 308 | VIDEO OFFERS PROFIT SCORE 310 |
|---|---|---|---|---|
| 210320291 | 5 | 6 | 0.20 | $0.25 |
| 068420018 | 2 | 1 | 0.11 | $0.42 |
| 300459983 | 7 | 8 | 0.76 | $1.00 |
| 001835574 | 2 | 3 | 0.04 | $0.03 |
| 262618799 | 10 | 10 | 0.93 | $0.67 |
| 068400001 | 6 | 5 | 0.52 | $0.30 |

FIG. 11

METHOD, SYSTEM AND APPARATUS FOR TARGETING AN OFFER

FIELD

Embodiments generally relate to a method, system and apparatus for targeting one or more offers.

BACKGROUND

Many systems and methods for providing advertisements are well known. Some of the systems create a more efficient advertising environment by providing ads to those individuals that are most likely to be interested in the advertised product or service. Typical ad targeting is accomplished by analyzing data from previous ad campaigns to develop models to "target" where ads in a current or new campaign should, or will be sent. Offers are both legally and practically different from advertisements however, and yet have for most purposes been treated similarly. Unfortunately, standard targeted advertising methods, as applied to offers for the sale of goods or services, have proven deficient in their ability to maximize sales volume and revenue.

SUMMARY

Embodiments provide an offer targeting apparatus, means, computer program code, system, and method. According to some embodiments, a method of targeting one or more offers may include receiving data indicative of information associated with a user, determining a value of a metric associated with the user based on the data indicative of information associated with the user, verifying that the value of the metric associated with the user is valid, selecting an offer from a plurality of offers where each of the offers has a score associated with the value of the metric, and providing data indicative of the selected offer.

In some additional embodiments, a method may include receiving data indicative of information associated with a user; determining a value of a first metric associated with the user based on the data indicative of information associated with the user; verifying the value of the first metric associated with the user; determining a value of a second metric based, at least in part, on the value of the first metric; selecting an offer from a plurality of offers based at least in part on the value of the second metric, each of the plurality of offers having a score associated with the value of the second metric; and providing data indicative of the selected offer.

In some embodiments, a method of targeting one or more offers may include generating for each of a plurality of values of a metric associated with a user scores associated with a plurality of offers, receiving fulfillment data on at least one of the offers, and updating the scores based on the fulfillment data.

In further embodiments, a method of targeting one or more offers may include receiving a first signal where the first signal includes data indicative of information associated with a user, selecting based on the data indicative of information associated with the user a plurality of offers for simultaneous display on a web page, and providing a second signal where the second signal includes data indicative of the plurality of offers.

In some other embodiments, a system, apparatus, article of manufacture, means, computer program code, etc., may implement one or more of the methods described herein.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 11 is a block diagram of an exemplary database table in accordance with some embodiments.

DESCRIPTION

Figure 1:
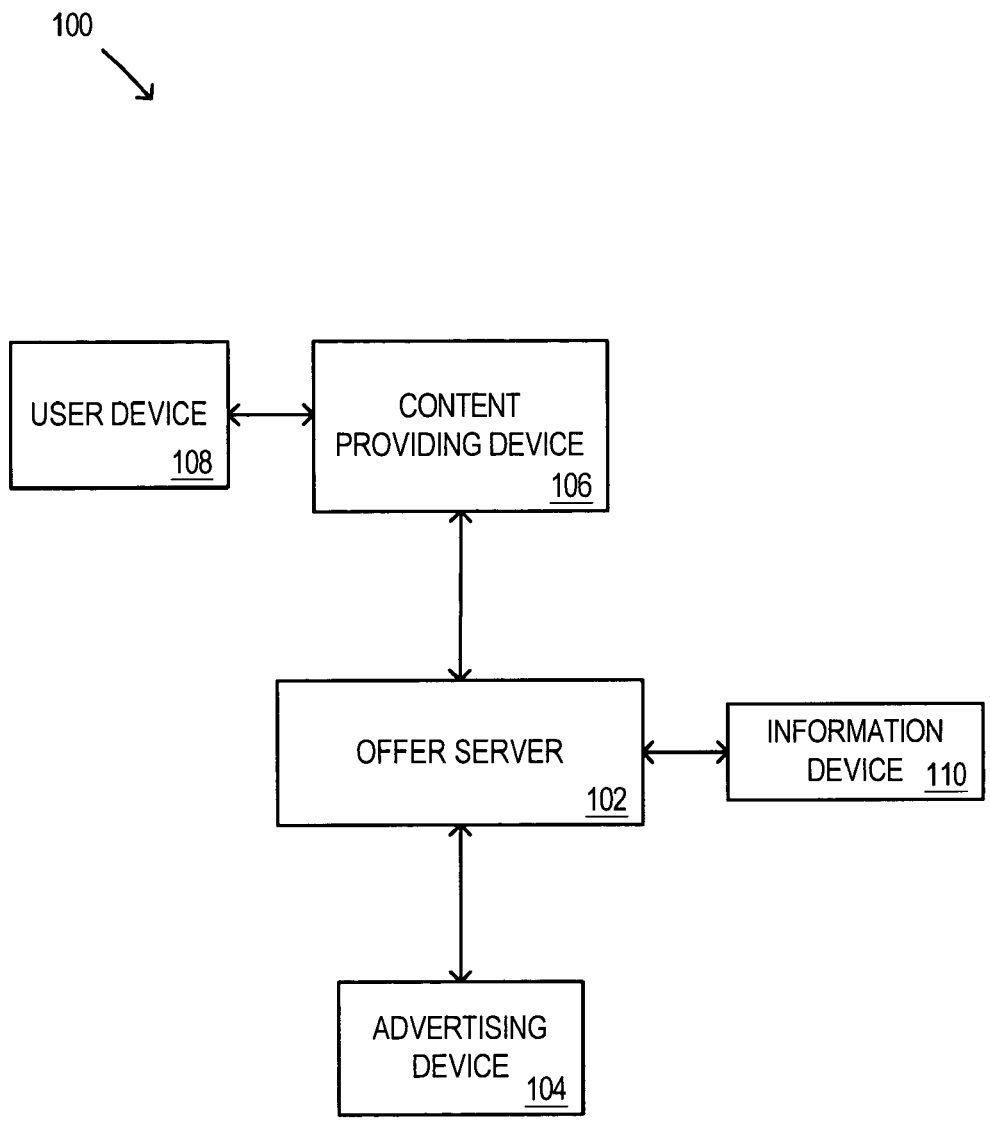
FIG. 1 is a block diagram of a system in accordance with some embodiments.

Applicant has recognized that there is a market opportunity to target one or more offers to a user in an efficient, effective, precise, and real-time manner. Applicant has further realized that a market opportunity exists for an effective targeted offer scoring model capable of protecting a user's privacy. Applicant has also realized that there is a need to further enhance the ability of advertisers and sellers to target offers to a user in a tiered manner. The term "tiered", as used herein, generally refers to a system or method for selecting multiple offers that can be displayed or otherwise provided to a user. Some of the offers may be displayed more prominently than other offers. In some embodiments, the offers are selected for simultaneous display on a web page. Also according to some embodiments, multiple offers may be selected using multiple selection methods based on multiple selection criteria.

As used herein, the term "offers" may include legal offers and/or non-legal offers. Offers may differ from advertisements in several ways. For example, many offers are "legal offers". Legal offers may include offers that create binding contracts that are enforceable in equity and at law. Such an offer may be or include a specific proposal provided by a party to a user to enter into an agreement with a user, that when coupled with an acceptance by the user, creates a contract between the party and the user. For example, a car dealer may "offer" to sell a specific vehicle for a specific price, to a particular consumer. Such an offer, if properly accepted by the consumer, would create a binding contact between the car dealer and the consumer for the sale of the car. A non-legal offer may be or include an offer that does not meet the criteria to be a legal offer.

Advertisements, on the other hand, may not contain pricing or sale information directed to a specific consumer. In the absence of such a specification, the advertisement fails to create a binding contract between a seller and a buyer. For example, the same car dealer may advertise that the newest model of a popular car is available for sale. The advertisement may contain appealing graphics, sounds, and/or vehicle information, and may even provide a price. Because the advertisement is directed to the consuming public (or a portion thereof) at large however, no legally binding offer has been made (i.e., the price term is not binding).

In general, offers contain all terms necessary to effectuate a sale or purchase while advertisements only provide information that may include some of the terms required for an offer. Both may (and often do) include graphics, text, sounds, animations, links, speech, and smells (e.g., perfume advertisements). As used herein, the term "offer" may include any communication, data transmission, signal, object, message, or device that conveys or presents information associated with the sale or lease of products and/or services. Offers may be as simple as a listing of a single price and a single product, or may include a plurality of terms, conditions, warranties, and/or guarantees for a plurality of products and/or services.

An example of an offering process may be exemplified by a user navigating through the Internet. The user may, for example, connect to the Internet from a personal computer (PC) or other user device (e.g., personal digital assistant, telephone) that displays web pages through a browser. The user can then travel to various web pages or web sites hosted by one or more web content providers. For example, the user may visit the web site of a book seller. The book seller can provide various forms of content on the web site, including book reviews, articles, stories, and an online store. An advertiser may wish to display offers to the user when the user visits the online store of the book seller. The advertiser may be, for example, a bicycle retailer or the advertising representative of a bicycle retailer. The bicycle retailer may wish to send offers to a user who purchases or expresses interest in books relating to bicycles and/or bike riding or meets other targeting criteria established by or for the bicycle retailer. For example, an offer to such a user may include a special price or discount on a bicycle, such as "new mountain bike for only $99". Such an offer may be sent directly to the book seller/content provider for display on the book store web page, or may be selected and/or transmitted from an offer targeting device.

The offer targeting device may be a computer or computer server that is dedicated to serving offers to various content provider web sites across the Internet. As used herein, the terms "serving" or "serving offers" generally refer to the displaying, showing, downloading, providing, distributing, and/or transmitting of offers, web pages, or other materials to various viewers, buyers, consumers, and other users. The offer targeting device may be operated by, or on behalf of the advertiser, or may be a third-party entity that sits between the advertiser and the content provider. Information about the user may be used by any of the content provider, the advertiser, and the offer targeting device to serve or display personalized or targeted offers to the user.

Some embodiments described herein provide a method of targeting one or more offers in which user information is verified in order to more accurately select one or more offers that may be provided to a user, and/or more appropriately charge advertisers for the offers properly shown. In some embodiments, the user information may be received from the user (e.g., during a user registration process), from a content provider (e.g., a content provider that is hosting a web site accessed by the user), from a database (e.g., a database storing previously obtained user information), or from various other entities and/or sources. Some embodiments contemplate real-time and other dynamic updating of a scoring model to enhance offer selection for targeting offers to a user. Some embodiments also provide for a tiered offer targeting scheme which increases the probability that a user will take action in relation to an offer or plurality of offers. Other configurations and benefits will become apparent to those skilled in the art from the descriptions, illustrations, and examples herein.

Referring first to FIG. 1, a block diagram of a system for targeting offers 100 is depicted for use in explanation, but not limitation, of described embodiments. Upon reading this disclosure, those skilled in the art will appreciate that different types, shapes, and configurations of systems, apparatus, and methods may be used.

In some embodiments, the system for targeting one or more offers 100 may include an offer server 102 in communication with an advertising device 104 and a content providing device 106. In some embodiments, the content providing device 106 hosts one or more web pages or web sites that may be accessed by one or more user devices 108 (e.g., a computer, a personal digital assistant, a cellular or wireless telephone, etc.) operated by various users. The content providing device 106 may provide the offer server 102 with information regarding a user that accesses the content provider's web site(s). Using this information, the offer server 102 may select one or more offers provided by the advertising device 104 and/or the content providing device 106, and provide the information or other data regarding the one or more offers to the content providing device 106. The content providing device 106 can then insert information regarding the one or more offers into one or more web pages hosted by the content providing device 106 and served to the user device 108 such that they are displayed to a user on the user device 108. These offers are "targeted" because they are provided to the specific user based on characteristics associated with the specific user and/or other targeting criteria.

As used herein, the terms "communication" and "connection" generally refer to or may include, without limitation, any known or available method, device, or system which enables two or more devices to send and receive signals, data, information, etc., between themselves and/or other devices. Examples of communication types and/or connections include, but are not limited to, the World Wide Web, a Local Area Network (LAN), a Metropolitan Area Network (MAN), a Wide Area Network (WAN), a proprietary network, a Public Switched Telephone Network (PSTN), a wireless network, and/or an Internet Protocol (IP) network such as the Internet, an intranet, or an extranet. Similarly, the signals used in such communications may be radio frequency (RF), infrared radiation (IR), satellite, cellular, wireless, optical, microwave, or of any other known or available type and/or combination of types.

The offer server 102 may be any known or available type of computing device including, but not limited to, a PC, a server, a web server, host or mainframe computer, and any other type of device known, available, or described herein. The offer server 102 receives data indicative of one or more offers from the advertising device 104. The advertising device 104 may be owned, controlled, monitored, or operated by or on behalf of an advertiser, merchant, or other product seller and/or service provider. In some embodiments, the targeted offer system 100 may include more than one advertising device 104. Offers, which may be directed to offering any number of possible goods and services, are transmitted from the advertising device 104 to the offer server 102 for use by a content providing device 106 in providing offers to users. In some embodiments, the content providing device 106 may be or include any device, entity, site, or location in or on which an advertiser may wish to place offers. In some embodiments, the content providing device 106 is a web publishing server. Also, according to some embodiments, the offers may be provided to the content providing device 106 for ultimate targeted placement and/or viewing on or by a user device 108.

In this way, a user operating a user device 108 may visit a web site hosted by a content providing device 106 and view or receive targeted offers.

According to some embodiments, a user device 108 is in communication with and/or connected to the content providing device 106. In some embodiments, the targeted offer system 100 may include more than one user device. In some embodiments, the user device 108 may be a PC, laptop, personal digital assistant (PDA), or cellular, wireless, or wired telephone, or other wired or wireless device operated by or on behalf of a user wishing to access the content providing site 106. In some embodiments, the user device 108 is a PC operated by a user and connected to the Internet. The user device 108 may be used to access various content providing devices 106 connected to the Internet and operated by various content providers. When a user device 108 is connected to a content providing device 106 (e.g., accessing a web site or web page hosted by the content providing device 106), the offer server 102 may cause or facilitate information regarding one or more offers provided by the advertising device 104 to be sent to the content providing device 106, which in turn causes or facilitates information regarding the one or more offers to be sent to the user device 108 for display by the user device 108 (e.g., display on a web page served by the content providing device 106 to the user device 108). It is in such a manner that targeted offers may be disseminated from advertising devices 104 to user devices 108.

To assist with and generally enhance the offer targeting process, and according to some embodiments, an information device 110 is connected to and/or in communication with the offer server 102. In some embodiments, the targeted offer system 100 may not include any information devices 110 or may include more than one information device 110. The information device 110 may be an on-line or off-line information source. In some embodiments, the information device 110 provides off-line demographic data to the offer server 102 so that the offer server 102 may verify the validity of user data received from either a content providing device 106 or a user device 108. The information device 110 may also be a device and/or database internal to the offer server 102 and used to store, aggregate, and/or process demographic or other information.

Those skilled in the art will appreciate that each of the targeted offer system 100 and the devices 102-110 shown therein may be or include one or multiple computers, software applications, servers, programs, procedures, devices, or any portion, piece, component, or combination thereof. Similarly, the targeted offer system 100 may comprise fewer or more devices than those shown in FIG. 1. Multiples of any device 102-110 may also be provided without deviating from the scope and purpose of the claimed embodiments. The devices 102-110 may be in direct, indirect, continuous, intermittent, wired, or wireless connection and/or communication through any known or available communications medium. Any and all devices 102-110 may also reside within, adjacent to, or attached to any other device 102-110, and any device 102-110 may be connected to and/or in communication with any other device or devices 102-110. For example, the offer server 102 may be in direct communication with one or more user devices 108 so that offers may be sent directly from the offer server 102 to a user device 108. In some embodiments described herein, the offer server 102 sends offers via e-mail directly to a user device 108.

Figure 2:
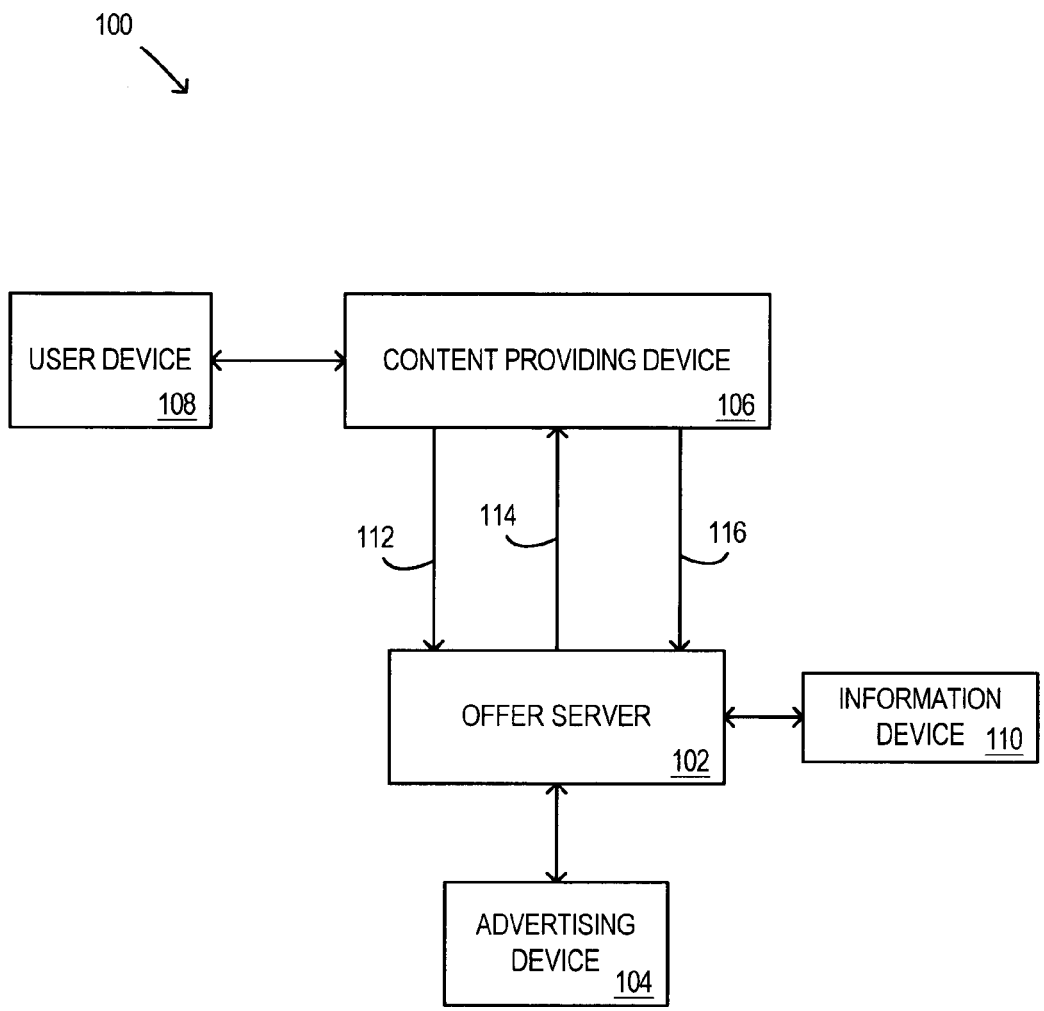
FIG. 2 is a block diagram of a system in accordance with some embodiments.

Turning now to FIG. 2, a block diagram of a system for targeting offers 100 according to some embodiments is shown. The targeted offering system 100 includes the offer server 102, the advertising device 104, the content providing device 106, the user device 108, and the information device 110, previously described above. Also shown in FIG. 2 are an information path 112, an offer path 114, and a fulfillment path 116. According to some embodiments, the information path 112 is used by the content providing device 106 to send user information or other related data to the offer server 102. The types and purposes of such information are described elsewhere herein. Offer path 114 may be used to send offers or other offer-related data or information from the offer server 102 to the content providing device 106. The fulfillment path 116, according to some embodiments, may be used to send offer response and/or offer fulfillment data or related information from the content providing device 106 to the offer server 102. Each path described herein 112-116 may be any known or available internal or external connection, port, bus, channel, wire, device, or system that enables unidirectional or multidirectional communication. Any one or more of the described paths 112-116 may be or represent the same physical entity, channel, network, connection or device, or any component or portion thereof. In some embodiments, any one or more of the paths 112-116 may include multiple paths. The targeted offer system 100 may also include more or fewer paths than described herein without deviating from the scope and purpose of the claimed embodiments.

Figure 3:
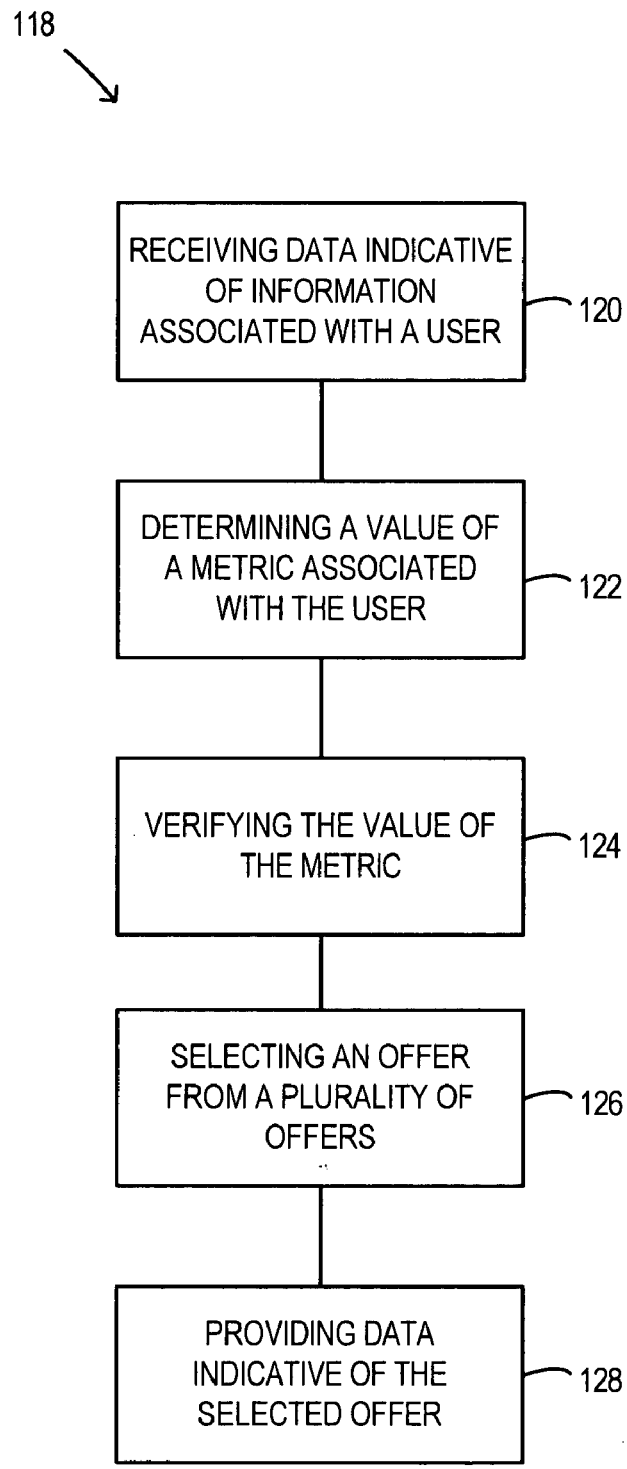
FIG. 3 is a method in accordance with some embodiments.

Turning now to FIG. 3, a method of targeting offers 118, according to some embodiments is shown. At 120 the offer server 102 receives data indicative of information associated with a user. As used herein, the phrase "data indicative of" refers to data, information and/or signals that represent, indicate, and/or describe a particular item, device, person, value, or idea. The data may also be associated with or related to the particular item, or may indeed be the item itself. For example, the data received by the offer server 102 at 120 may be, in some embodiments, information associated with a user. The information associated with a user may include any number of variables, metrics, values, or formulas associated with the user. Examples of such information include, but are not limited to information regarding the user's age, gender, marital status, employment, ethnicity, income, contact information (address, zip code, zip+4, phone number, e-mail address, etc.), purchase history, interests, and/or hobbies.

For example, data indicative of information associated with a user may be or include a value of a metric associated with the user and/or a code, variable, or indicator of such value. For instance, the data may be or include a zip+4 code value of "210320129" indicating the zip+4 code in which the user resides or works. Thus, the zip+4 code is the metric and "210320129" is the metric's value for the specific user. In some embodiments, the data may be or include a code such as "0000124" which corresponds to the stored zip+4 code value of "210320129". Also according to some embodiments, for example, the data may be or include a street address of "83 Low Street" indicating the street address where the user resides or works. The metric is the street address, and the value of the metric is "83 Low Street". In some embodiments, the value of the metric (e.g., "83 Low Street") may be used to determine a value of a second metric (i.e., a value of "029310293" for a zip+4 metric associated with the user).

The data may be transferred from a user device 108 to a content providing device 106 in accordance with various interactions typical between the devices (e.g., a user registration process), and then directed through an information path 112 to the offer server 102. The data may also originate from a memory or storage device of the content providing device 106 (i.e., a previously registered user comes back to the content site and associated user information data is loaded from memory or retrieved from a database). In some embodiments, the data may also originate from an advertising device 104 (i.e., an advertiser may have user information from previous offer campaigns that it wishes to incorporate into the current targeted offer campaign). At 122 the data received by the offer server 102 is analyzed to determine at least one metric and/or at least one value of a metric associated with the user. As described herein, the data indicative of information associated with the user may include one or many metrics or values of a metric associated with the user. For example, a metric may be a telephone number, and the value of the metric may be "(891) 023-9410", indicating a home, work, cellular, or other telephone number associated with the user.

In some embodiments, information about or associated with a user may have been obtained from the user in the past. In addition, a content providing device (e.g., a web site server) may have placed an electronic "cookie" on a user device when the user previously accessed the content providing device with the user device. The cookie may be associated with a code or other identifier that is associated with the user. When the user accesses the content providing device again, the content providing device can retrieve the cookie from the user device and identity the user based on the cookie. This may allow the content providing device to retrieve, access, request or otherwise obtain information about the user without the user again supplying the information. The content providing device can then provide some or all of this information to the offer server 102 as part of 120. The content providing device also may provide the user code or other identifier to the offer server 102, which may allow the offer server to identify the user and obtain additional information regarding the user. This may occur particularly when the offer server 102 is selecting and/or providing offers to one or more content providing devices, each of which may provide different user information to the offer server 102. In this way, the offer server 102 can develop a profile of the user based on information provided from the different content providing devices or other sources.

In some embodiments, the data may arrive from the content providing device 106 as or in a string or stream of information. During 122, the string may be parsed examined, or otherwise used by the offer server 102 to extract or obtain one or more metrics or one or more values of one or more metrics. The metric may be determined or used based on the type and/or number of metrics available in the data, or may be chosen or used because of a known or suspected relevance or correlation to marketing, advertising, and/or offering statistics. For example, in some embodiments, the metric is a zip+4 code and the value of the metric is the user's specific zip+4 code. There are approximately thirty-three million zip+4 codes in the United States, each typically representing one to six business and/or households. During 122 the offer server 102 obtains the user's specific zip+4 code from the data it received or obtained during 120. In some embodiments, the value of the metric may be used to determine at least one other value of a metric associated with the user. For example, the data received at 120 may be a user's street address and the zip+4 code corresponding to the user's street address may be determined (e.g., looked-up in a table of all known zip+4 codes and corresponding addresses) based on the value of the street address metric.

During 124, the offer server 102 and/or some other device confirms or otherwise verifies the value of the metric determined during 122. In some embodiments, verifying may not be needed and 124 might not be performed or used. The metric may be verified by cross-referencing its value for a user with a set of known and/or stored values for the metric or the metric values for the user. In some embodiments, an information device 110 may be a third-party demographics provider that cross-references the metric and verifies its accuracy and/or validity on behalf of the offer server 102. The offer server 102 and/or one of its components may also perform such verification either alone, or in combination with one or more information devices 110. For example, the offer server 102 or an information device 110 of a demographics provider may attempt to locate a user's zip+4 code in a table of all known zip+4 codes and verify it with regard to the user's street address, city, and/or state information.

For example, if a user enters a zip+4 code of "004630001" into a content providing device 106, the content providing device 106 may forward that information to the offer server 102 (i.e., for verification and/or offer targeting). In some embodiments, the content providing device 106 may also transmit other information and/or metrics associated with the user, such as a street address or telephone number. For purposes of this example, assume that the street address of the user, "100 Main Drive", is also sent to the offer server 102. The offer server 102 may then look up the zip+4 code of "004630001" in a database of all known zip+4 codes. The database may be maintained and/or housed by any of various devices and in any manner known, available, and/or described herein. Within the records associated with the zip+4 code "004630001", the offer server 102 may search for the street address "100 Main Drive". If "100 Main Drive" is a street address that corresponds to a record associated with the zip+4 code "004630001", then the zip+4 code may be deemed "valid".

The terms "valid" and "validity" as used herein refer to one or more values of a metric that have been matched and/or correlated to or with other metric values associated with a user. According to some embodiments, a "valid" value of a metric may be a value that has a definitive and/or higher probability of not being a false (e.g., made up) or miss-entered (i.e., a typographical error). Thus, verifying a value of a metric may be or include determining that the value has or exceeds a threshold likelihood or percentage of being correct. In some embodiments, another metric such as a telephone number and/or area code may be used to further verify the value of the user metric (i.e., the street address). If the street address for the user cannot be located, then the information for the metric has either been entered erroneously or fraudulently. That is, the user's information is inaccurate.

For example, assume that the street address of the user, "100 Main Drive", is the value of the metric sent to the offer server 102. The offer server 102 may then look up the zip+4 code of "004630001" in a database of all known zip+4 codes and associated street addresses. The database may be maintained and/or housed by any of various devices and in any manner known, available, and/or described herein. Within the records associated with the street address "100 Main Drive", for example, the offer server 102 may search for a zip+4 code. If a zip+ code such as "004630001" corresponds to a record associated with the street address "100 Main Drive", then the street address may be deemed "valid". In this manner, a first metric and/or value of a first metric (i.e., the street address) may be used to determine a second metric and/or the value of a second metric (i.e., the zip+4 code).

In the case of erroneously entered information, the offer server 102, the information device 110, or a combination of the two may attempt to correct the information. Logical processes may be conducted, for example, using other metrics associated with the user to determine the appropriate identity of the user and all necessary metric values. Because the value of the chosen metric is, for targeting purposes, an "identity" of the user, it will be referred to as such herein. It should be noted that in some embodiments where non-personal identifiable information ("non-pii") is chosen as a metric (e.g., zip+4 code), this "identity" does not identify a specific individual or user for purposes beyond targeted offering. Thus, the user's privacy can be maintained.

If the metric cannot be corrected or verified however, than the user is unidentifiable. Because the user's information is not valid however, no informative targeting decision can be reached regarding the user, because the identity of the user (in as much as the specific metric chosen) is unknown. In some embodiments, a special type of targeted offer may be appropriately directed to unidentifiable users. Marketing data may indicate, for example, that users entering false data are likely to accept a certain type of offer. For example, users that provide false information may be likely to accept an offer for debt consolidation. For example, even though the identity of the user is not initially known or ascertainable, an offer appropriate for such a class of users (a pseudo-targeted or class-targeted offer) may nonetheless increase the chances that a served offer will be accepted or acted upon. In some embodiments unidentified users may be served either a default offer or no offer at all.

Once the value of the metric associated with the user has been determined and verified, the offer server 102 selects an offer from a plurality of offers at 126 based on the value of the metric. Information regarding the offers may be stored within the offer server 102, within the content providing device 106, or may be received from an advertising device 104. Each offer and/or offer type has a score associated with each known or available value of the chosen metric. For example, each offer may have a rank ranging from one to ten for each and every zip+4 code. Zip+4 codes where the offer performs or is likely to perform very poorly (i.e., is not accepted or is not likely to be accepted) may have scores of one or two, while more preferable zip+4 codes where the offer is often accepted or is likely to be accepted may have scores of nine or ten. In some embodiments, the offer that has the highest rank for the particular zip+4 code metric value associated with the particular user is selected. In some embodiments, multiple offers are selected from the plurality of available offers. Examples of other score types, methods of deriving them, and methods of selecting offers are described elsewhere herein. As used herein, the term "offer type" generally refers to a type, class, or group of offers having at least one characteristic in common. For example, magazine offers are offers related to the purchase of magazines and/or magazine subscriptions. Offers for particular magazines and/or magazine subscriptions are members of the same offer type (i.e., magazine offers). The terms "offer type" and "offer class" may be used interchangeably herein.

In some embodiments, additional information, rules, heuristics, etc. may be used to select one or more offers during 126. For example, the offer server 102 may use a user's age, gender, personal preferences, user device type, IP (Internet Protocol) address, connection speed, location, income level, occupation, past offer acceptance or rejection information, etc. to help it select one or more offers. As another example, advertisers may have rules regarding when, how often, where, in what context, on what web sites, to whom, etc. their offers can be provided or displayed which the offer server 102 may take into account in some embodiments.

At 128 the offer server 102 provides, via an offer path 114, data indicative of the selected offer or offers to the content providing server 106. In some embodiments, data indicative of the selected offer may be a variable, an integer, a flag, a code, or any other indicator of the offer, and/or information (i.e., text, graphics) regarding the selected offer itself. For example, the data may include a code such as "001" which is associated with a selected offer, or may contain text, graphics, sounds, and/or other data associated with or defining the selected offer. According to some embodiments, the data indicative of the selected offer or offers may be received from another device such as a content providing device 106. In some embodiments, information regarding the plurality of offers is stored on the content providing device 106. In such embodiments the offer server 102 may provide an offer code or a Boolean operator to the content providing device 106. The offer code represents an offer amongst the plurality of offers located on the content providing device 106 that the offer server 102 has selected. By receiving the offer code, the content providing device 106 knows which offer the offer server 102 selected. Those skilled in the art will recognize that various variables, integers, flags, codes, or indicators may be used to identify a selected offer. In some embodiments, the operator and/or owner of the content providing device 106 may choose whether or not to send the offer selected by the offer server 102 to a user device 108 for display. The offer server 102 thus acts as an "offer targeting consultant" or "offer selection consultant" for the content providing device 106. In other embodiments the offer corresponding to the offer code provided by the offer server 102 may be automatically sent by the content providing device 106 to a user device 108 for display.

A Boolean operator or other indicator supplied to the content providing device 106 may indicate a yes/no decision regarding a pre-determined offer. For example, a single "bill me later" offer may be available for display by or on a user device 108. A "bill me later" or "bill me" type offer is an offer that can be accepted by a user without requiring payment of the agreed-upon offer price at the time of the transaction. For example, a magazine "bill me" offer can be accepted by a user and the user may be billed at some later time (e.g., a bill may be sent to the user along with the first magazine in the subscription). The offer server 102 provides the content providing server 106 with a Boolean operator or other indicator of "Yes" indicating that the current user should be shown the "bill me" offer, or "No", indicating that the current user should not be shown the "bill me" offer. Because a default offer may also be pre-specified, the negative Boolean operator may also indicate that the default offer should be shown to the current user. Instead of a pre-specified single default offer, any number of other multiple offer selection schemes may be used to handle the negative Boolean operator situation. In some embodiments, the negative Boolean operator may indicate to the content providing device 106 that no offer should be shown to the current user.

In embodiments where the information regarding the plurality of offers are stored and/or located on the offer server 102 or the advertising device 104, the provided data indicative of the selected offer may be the offer itself (e.g., text, graphics, offer details). For example, the offer server 102 may send a selected offer or offers, via an offer path 114, from either within the offer server 102 or the advertising device 104 to the content providing device 106. In such embodiments, the content providing device 106 is not required to store information regarding a potentially large number of offers and related data, thus reducing the storage capacity needed of the content providing device 106. In some embodiments, the content providing device 106 may incorporate a selected offer or offers sent from the offer server 102 into a pre-existing or newly or dynamically created web page. Such offers may be inserted, for example, into a web page or web flow displayed on a user device 108 in association with a user registration or login process.

According to some embodiments where the plurality of offers are stored and/or located outside of the content providing device 106, the offer server 102 may serve a web page including the one or more selected offers. The web page may be created dynamically by the offer server 102, or may be derived from a template or other means of construction. The offer server 102 may send the web page over an offer path 114 to the content providing device 106 for incorporation into the web flow of the content providing device 106, or may serve the web page itself. For example, the offer server 102 may not only receive data indicative of information associated with a user at 120, but may also have a user directed to a web page or site of the offer server 102. In some embodiments, the provided data indicative of the selected offer at 120 may include a uniform resource locator (URL) identifying a web page or site of the offer server 102.

Once a user is directed to the URL of the offer server 102, a web page may be displayed by the offer server 102 that includes the one or more selected offers. In some embodiments it may be desired for the offer server 102 to create or design the served web page to look similar to the web pages served by the content provider 106. The web page served by the offer server 102 may be of various styles, types, or designs both known to those skilled in the art and described elsewhere herein. In such a manner the user may continue navigating through the web flow without indication that the flow migrated from the content providing device 106 to the offer server 102. The user device 108 may become either directly connected to the offer server 102 or may be directed or connected through the content providing device 106. After some action, interaction, or fulfillment of a pre-determined condition (e.g., a period of time), the user may be directed or sent back to the content providing device 106 for a continuation of the appropriate web flow.

In some embodiments, a web page served by the offer server 102 at 128 may include a number of various controls. The controls may be ActiveX® Controls or Java™ Applets such as checkboxes, pick-lists, forms, or any other known or available input mechanisms. The use of controls allows user interactions to be monitored and/or recorded. Such interactions may be indicative of interest in or acceptance of one or more of the selected and/or displayed offers. In some embodiments, this fulfillment or offer response data can be an important metric for use in understanding how different types of users are likely to react to different types and/or classes of offers. In some embodiments, offer response data may be or include data associated with offer impressions (i.e., data regarding how many times an offer has been shown to a user), data indicative of or otherwise associated with offer acceptances and/or rejections, data associated with user actions, data associated with user inaction, data associated with offer-related user purchases, and/or other data associated with users and their interactions with offers. For example, offer response data may include the number and/or sequence of keystrokes a user makes while viewing an offer, the mouse and/or pointer movements made by a user viewing an offer, the failure of a user to interact with and/or accept and offer, the number of times an offer is shown to a user (or users), and/or the quantity, location, price, and/or type of purchases made by a user (that may or may not be related to an offer shown to the user).

In embodiments where the offer server 102 serves a web page to a user, this offer response data may be directly recorded by the offer server 102 via an internal fulfillment path 116. Where the content providing device 106 serves the selected offer or offers, the offer response data may be transmitted from the content providing device 106 through an external fulfillment path 116. In some embodiments, fulfillment data corresponding to an offer-related user purchase may be received over a fulfillment path 116 from either the content providing device 106 or a third-party vendor or merchant.

In some embodiments, offer response and/or fulfillment data may be used, according to some embodiments, to both generate offer reports and to update a scoring model. For example, offer response information regarding one or more users' acceptance of rejection of an offer may be used to update a scoring model associated with the offer. As another example, the offer server 102 may use offer acceptance and rejection information for an offer provided to multiple content providing devices to update a scoring model for the offer. Thus, information regarding acceptance or rejection of an offer by multiple users, display of the offer by multiple content providing devices, etc. may be used to refine the scoring model for the offer.

The data also may be used, for example, by the offer server 102 to create a report describing the performance of certain offers and/or to generate a billing report associated with the offers. The report may be sent by the offer server 102 to an advertising device 104. The advertising device 104 may utilize the report to assist in formulation of new offers, decide which offers it wishes to show or which offers to include in the plurality of stored offers, and/or to send appropriate payment for offers selected by the offer server 102 and/or displayed on user devices 108.

The offer server 102 may use offer response and fulfillment data to create and/or update a scoring model. The scoring model may be any various method, formula, process, procedure, or combination thereof known or available to those skilled in the art. In some embodiments the scoring model is a regression model directed to a particular metric associated with a user. Whichever type (or types) of scoring model is employed, the offer response and fulfillment data may be used to create and/or update the model and the scores associated with each of the plurality of offers. In some embodiments, because offer response and/or fulfillment data may be received and processed in real-time, the scoring model and respective offer scores may also be updated in real-time. Thus, according to some embodiments the selection of one or more offers at 126 may be updated to reflect the latest probabilities for each user in communication with the offer targeting system 100. This enhances the ability of the offer targeting system 100 to increase the amount of offers that are accepted by users, and thus increases the cost effectiveness of an advertiser's marketing dollars. In some embodiments, the offer scores and/or the scoring model may be transmitted to a content providing device 106, an advertising device 104, an information device 110, or any other available device or combination thereof, for use, processing, storage, or sale.

In some embodiments, the offer server 102 may use additional information, data, or variables to assist in selecting one or more offers, refine or update scoring models, etc. For example, if the offer server knows that a user is male, the offer server 102 may select one or more primary and/or secondary offers that have a higher acceptance rate by males than females. The selection of these offers may be in addition to any offer(s) selected in accordance with 126 described above. As further examples, an advertiser may want its offers displayed only on certain web sites and/or at certain times or prohibit display of its offers on certain web sites and/or certain times. A web site may refuse offers related to specific subject matter (e.g., a school may not want offers for guns displayed on its web site). An advertiser may not want an offer for perfume to be display on a Web site devoted to big game hunting or the same offer provided to a user within a certain time frame or if the user rejected the offer the first time. In addition, advertisers may want different versions of offers provided to a user depending on the user's type of user device (e.g., cellular telephone versus computer), connection speed (e.g., dial up connection versus broadband connection), location (e.g., an offer may be tailored differently for a person in California as opposed to a person in North Carolina), etc. As illustrated by these examples, the offer server 102 may alter selection of one or more offers based on advertiser rules, user demographic profile, content provider rules, the relationship or lack of a relationship between an offer and content provided by a content providing device (e.g., subject matter relationship), information obtained through use of a cookie, offer acceptance or rejection history, user history, a complementary relationship between two offers (e.g., if one offer is accepted by a user, another offer has an increased chance of being accepted by the user), a non-complementary relationship between two offers (e.g., if one offer is rejected by a user, another offer may have an increased chance of being accepted by the user), a user's location, etc.

Figure 4:
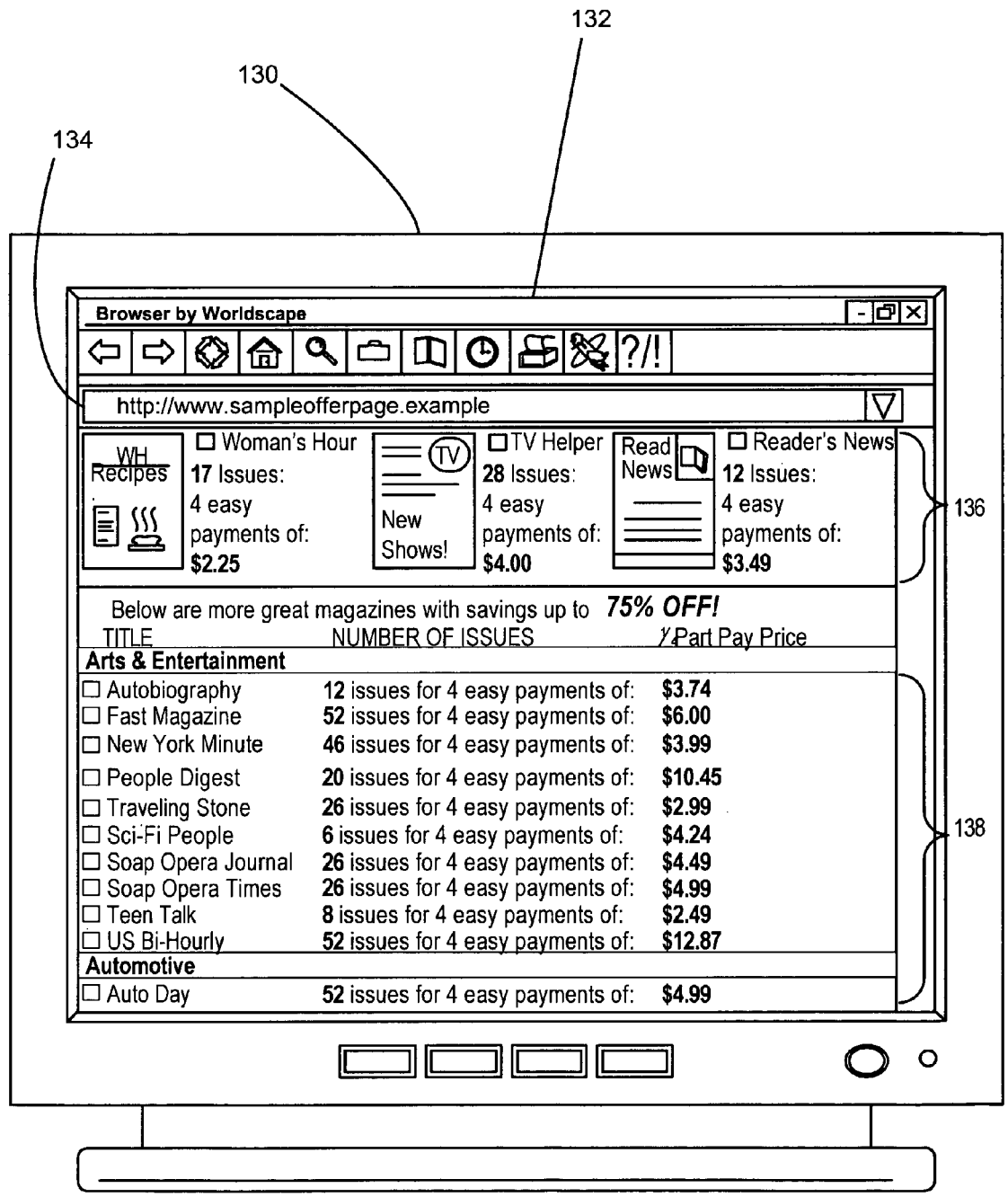
FIG. 4 is a screen display diagram in accordance with some embodiments.

Referring now to FIG. 4, a representative screen display diagram for targeting offers according to some embodiments is shown. In some embodiments, a user operating or associated with a user device 108 is in communication with and/or connected to the targeted offer system 100. The user device 108 may include various components, some or all of which may be typical to computing devices such as a PC. In some embodiments, the user device 108 has a display screen 130 on which a browser 132 operated by the user device 108 is displayed and used. The browser 132 may be any known or available browser including Microsoft® Corporation's Internet Explorer™. Included within the browser 132 may be a window, display, or representation of a URL 134 for facilitation of web browsing and surfing. Such URL 134 may indicate, for example, the Internet address of the current, requested, or previous web page accessed by the user. The example page shown in FIG. 4 is a web page containing various offers for magazines and/or magazine subscriptions. At the top of the web page are three primary offers 136, with a listing of multiple secondary offers 138 being presented underneath. Further details regarding use of primary offers 136 and secondary offers 138 are provided below. Additional discussion regarding FIG. 4 also is provided below.

Figure 5:
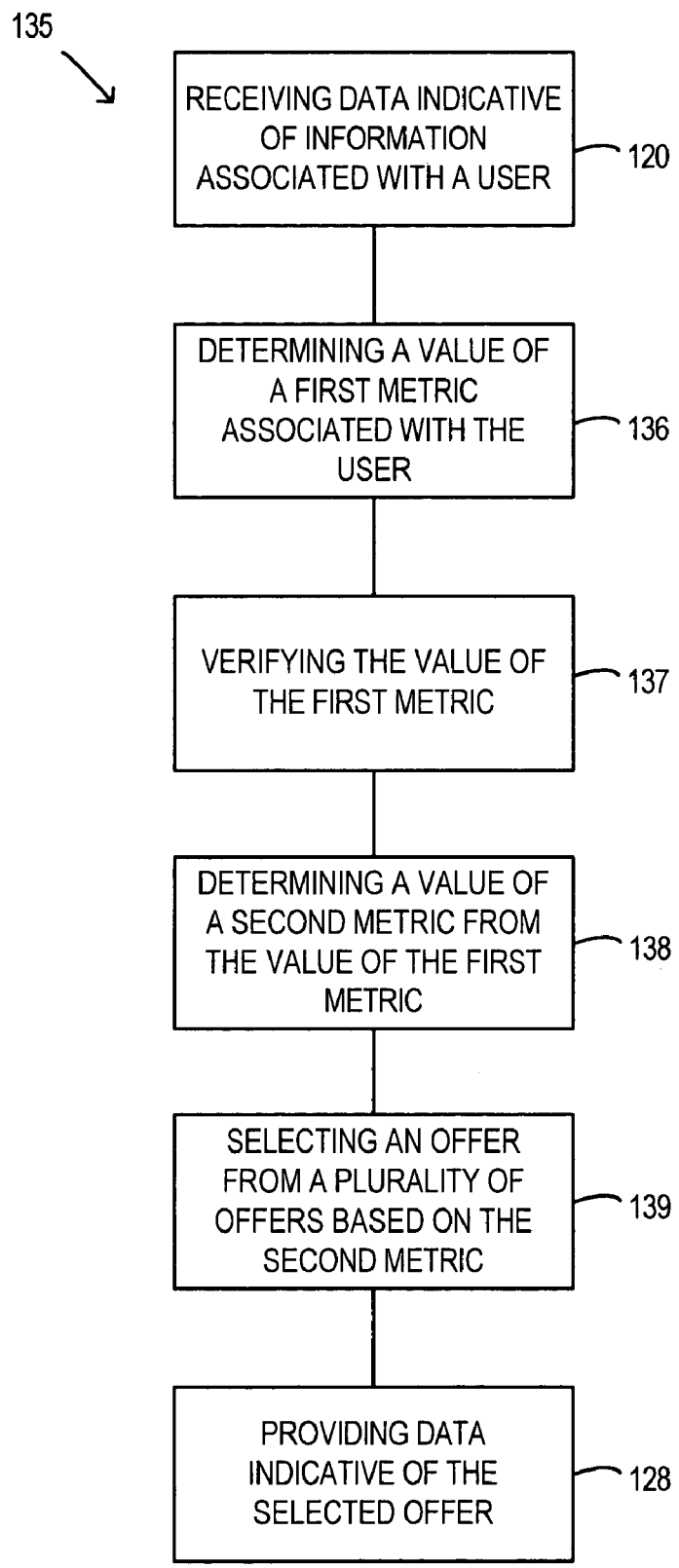
FIG. 5 is a method in accordance with some embodiments.

Referring now to FIG. 5, a method of targeting offers 135, according to some embodiments is shown. The method 135 includes 120 and 128 previously discussed above. In addition, during 136, the offer server 102 determines a value of a first metric associated with the user based on the user information received during 120 in a manner to 122 previously discussed above. The value of the first metric may be a postal address, area code, zip code, etc. associated with the user. Thus, in some embodiments, the value of a metric may be a number, text information, etc.

During 137, the offer server 102 verifies the value of the first metric determined during 136. In some embodiments of 137, the offer server 102 may determine if the value of the first metric is consistent with other information provided in the user information or retrieved or obtained from an information device. Thus, in some embodiments, verification during 137 may be or include a consistency check of user information. For example, suppose the user information received during 120 includes a street address and a telephone number. If the first metric is the street address and the value of the first metric is the specific street address for the user, during 137 the offer server 102 may verify that the specific street address is consistent with the area code in the telephone number provided in the user information. That is, does the street address provided in the user information fall within the area code provided in the user information. Thus, the offer server 102 can verify the value of the first metric by comparing it against other or known information (e.g., a known area code that corresponds to the first metric) and the area code provided as part of the telephone number in the user information. In some embodiments, the offer server 102 may store the known information, retrieve or receive it from an information device, or access an information device to obtain the needed information. As another example, the user information obtained in 120 also may include a zip code (but not a zip+4 code) for the user, which may be the value of the first metric for the user. During 137, the offer server 102 may verify that the zip code is consistent with the street address (e.g., the street address falls within the zip code) and the telephone number (e.g., the street address falls within the area code) provided in the user information.

During 138, the offer server 102 determines a value of a second metric from the value of the first metric. For example, if the offer server 102 knows or can determine the user's street address and/or the user's zip code (i.e., a value of a first metric), the offer server 102 may determine a zip+4 code for the user (i.e., a value of a second metric) as previously described above. In some embodiments, some or all of 138 may be performed in conjunction with or as part of 137. For example, this may occur when the value of the second metric is provided as part of the user information obtained during 120 and the consistency verification is done during 137.

In some embodiments 138 may be or include determining the value of a second metric using the value of the first metric and other information. For example, if the value of the first metric is a user's specific street address, the offer server 102 may use the street address along with other user information obtained in 120 (e.g., a zip code) to determine a specific zip+4 code (e.g., a value of the second metric) if the second metric is the zip+4 code. In some embodiments, if other information is used in addition to the value of the first metric to create the value of the second metric, the offer server 102 may obtain some or all of such information from an information device or other source.

During 139, the offer server 102 selects one or more offers based on the value of the second metric, in a manner similar to 126 previously discussed above. In some embodiments, if more than one offer is selected, the offer server 102 may select one or more primary offers and/or one or more secondary offers. The primary offer may be based on the value of the second metric plus additional information in some embodiments. The secondary offer may be based on the value of the first metric, the value of the second metric, other user information, offer selection rules, advertiser criteria, impression minimum or maximum requirements, etc.

During 128, the offer server 102 provides data indicative of the selected offer(s) as previously discussed above.

In some embodiments, the method 135 may include correcting some or all of the user information received during 120, selecting one or more offers from an offer class, creating a scoring table associated with one or more offers, receiving offer information from and advertiser device and/or a content providing device, receiving user information from an information device, generating one or more scoring tables or models, and/or other variations discussed above with regard to the method 118.

Figure 6:
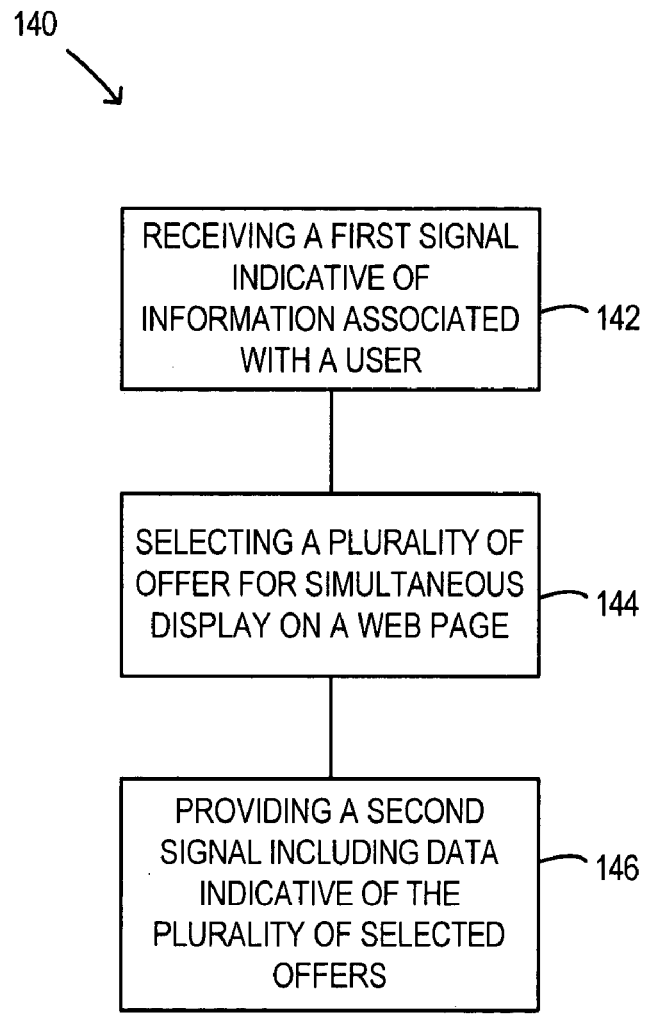
FIG. 6 is a method in accordance with some embodiments.

Referring now to FIG. 6, a method of targeting offers 140 according to some embodiments is shown. At 142 the offer server 102 receives a first signal containing data indicative of information associated with a user. Such information may be in accordance with embodiments described herein. Selection of a plurality of offers for display on a web page is accomplished at 144. The selection may, according to some embodiments, be based on the data received at 142. The offer server 102 may, for example, select multiple scored offers based on user information and/or metric values associated with a particular user. Verification of the validity of the user information and/or metric values may occur in some embodiments. The offers may be selected in accordance with scoring models and procedures described herein, or by any other means known or available. Selected offers may be chosen based on one or more offer classes or types, on an individual offer basis, or on any combination of criteria. In some embodiments, one or more high-ranked or scored offers or offer classes may be chosen as primary offers 136. Where an offer class is selected based on scoring or other selection criteria, individual offers within that class may then further be selected by any method, rule, criteria, heuristic, etc. known, available, or described herein.

In some embodiments, primary offers 136 may be or include targeted offers that may have high probabilities of being accepted by a particular user. In some embodiments, primary offers 136 may be offers chosen from a selected offer class. Primary offers 136 may also be selected based on the value of a metric associated with a user, based on a profit score (described elsewhere herein), or based on the number of impressions required for a particular offer. An offer impression refers to the display of an offer to a user. Advertisers may require as part of their offer campaigns, for example, that a particular offer be served, shown, or displayed a certain number of times and/or to a certain number of users.

In some embodiments any number of secondary offers 138 may also be selected for simultaneous display on a web page, creating a tiered offer presentation. The tiered offer presentation is shown in FIG. 4 where both primary offers 136 and secondary offers 138 are simultaneously displayed on a user device 108. In some embodiments, secondary offers 138 may have lesser scores or probabilities of being accepted by a user than primary offers 136, or may be selected based on other criteria. For example, secondary offers 138 may be a mix of various offers chosen for display independent of their respective offer scores. These secondary offers 138 may be instead chosen in an attempt to probe a user's interests in areas, subject matter, or genres where data on the user is lacking, satisfy one or more rules established by one or more advertisers, meet impression requirements, provide an offer tailored to the subject matter of a web site, provide a complementary offer, etc. Offer response data acquired from such strategically-targeted secondary offers 138 may provide valuable user information that may be used to further enhance a scoring model and future offer targeting.

In some embodiments, secondary offers 138 may be chosen from offer classes other than a selected offer class. Secondary offers 138 may also comprise all offers other than those selected as primary offers 136, or may be selected based on a metric associated with a user, based on a profit score (described elsewhere herein), or based on the number of impressions required for a particular offer. Thus, secondary offers 138 may be targeted or non-targeted offers, and may be chosen based on the same or different criteria than is used to select primary offers 136. In some embodiments, all selected offers are primary offers 136 and no secondary offers 138 are chosen or displayed. Management and coordination of the selection and/or display of both primary offers 136 and secondary offers 138 creates a tiered targeted offer system 100 capable of greatly increasing the fulfillment rate of offer serving campaigns.

Data indicative of the plurality of selected offers is provided by the offer server 102 at 146. As described herein, the provided data may include any number of codes, variables, or characters, or may also be the selected offers themselves (e.g., graphics, textual material, offer details), as previously described above. In some embodiments the data is provided to a content providing device 106. In other embodiments the data is transmitted and/or displayed directly to a user device 108. In some embodiments, the selected offers are displayed on a web page by the offer server 102 or content providing device 106.

An example of a web page residing at a URL 134 and displaying the selected offers is shown in FIG. 4. The URL 134, as described herein, may be associated with or provided by a content providing device 106 or the offer server 102. As shown in FIG. 4, primary offers 136 and secondary offers 138 may be displayed simultaneously on a web page displayed on a user device 108. Simultaneous display of offers may provide increased probabilities that at least one offer will be accepted by a user. The exemplary primary offers 136 are displayed in an upper portion of the web page and are presented with associated graphics and in a larger font than the secondary offers 138. Such a layout may enhance the probability that the already targeted primary offers 136 are accepted. Secondary offers 138 may be chosen as described herein, or may also be a simple listing of all other available offers. Those skilled in the art will appreciate that any web page layout may be used without deviating from the scope and purpose of the claimed embodiments.

Each offer shown in FIG. 4 is presented with an associated checkbox control that a user may click to select one or more particular offers. User interaction with the checkbox control and/or other controls may indicate an acceptance of an offer or an interest in finding out more information regarding a given offer or similar offers. Such user action may direct the user to a web site or page hosted by an advertising device 104, or a content providing device 108, or may simply consummate a transaction between the user and the advertiser or merchant associated with the chosen offer. User checkbox selection may also cause offer response data to be sent through a fulfillment path 116 to the offer server 102. In some embodiments, one or more separate buttons and/or interactive elements may be used to commit, enter, or submit a user's offer choices. For example, a user may select multiple offer-related check boxes and then click a "submit" button (not shown) to convey acceptance of the multiple selected offers.

Figure 7:
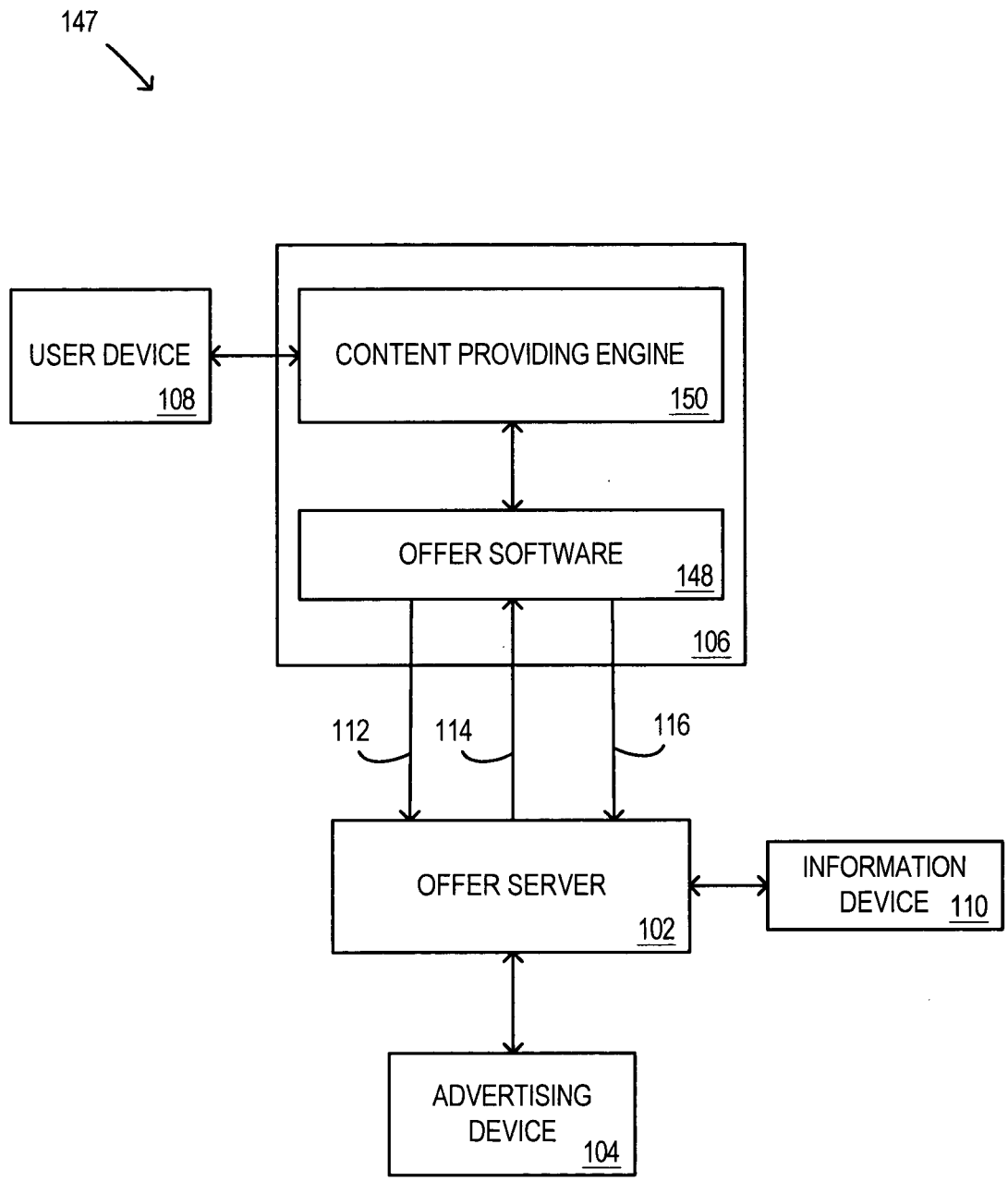
FIG. 7 is a block diagram of a system in accordance with some embodiments.

Turning now to FIG. 7, a block diagram of a system 147 in accordance with some embodiments is shown. In some situations it may not be desirable or possible for the offer server 102 to directly serve offers or offer web pages to a user device 108. Or it may be desirable for the content providing device 106 to have data regarding potential offers. Some embodiments therefore, include offer software 148 that resides in or on a content providing device 106, and that handles the selection of offers.

In some embodiments, the offer software 148 may be or include any type of client-resident software including, but not limited to, extensible markup language (XML) software, or XML-based simple object access protocol (SOAP) software. The offer software 148 is responsible for sending data indicative of information associated with a user over an information path 112 to the offer server 102. The offer server 102 may verify or otherwise confirm the data and/or a determined metric associated with a user, and may then transmit the verified (and/or corrected) information back to the offer software 148 via offer path 114. The offer software 148 may include or have access to one or more scoring tables with which it may look-up the verified metric value to retrieve one or more scores for one or more potential offers or offer classes. In some embodiments, the offer server 102 provides the offer software 148 with information and/or data regarding one or more available and/or selected offers. The offer server 102 also may supply scoring and/or offer targeting information to the offer software 148. The offer software 148 then may select one or more offers, and may direct, require, or suggest that the content providing engine 150 send the selected offer or offers to a user device 108 for display.

The content providing engine 150 may have, or have access to, the information it needs regarding the selected offer(s). The content providing engine 150 then can provide the data indicative of the selected offer(s) to the user device 108. The content providing engine 150 may be any piece, portion, or component of the content providing device 106 separate and/or distinct from the offer software 148. In some embodiments, the offer software 148 may reside within the content providing engine 150. In some embodiments, the content providing engine 150 and/or the offer software 148 may be implemented in software and/or hardware.

In some embodiments, the scoring table and/or scoring information is stored on the offer server 102. Such an arrangement may be desirable to reduce the amount of storage space required by the offer software 148 on the content providing device 106. With the scoring table stored on the offer server 102, the offer software 148 lacks the ability to independently select offers. Thus, the offer server 102 may not only verify and/or correct the data received from the offer software 148, but it may also select one or more offers. Information or data indicative of which offers were selected may then be transmitted to the offer software 148 from the offer server 102 via an offer path 114. Similarly, if the offers are not stored within the content providing device 106, then the offer server 102 may send data providing the details of the selected offer or offers to the offer software 148.

In some embodiments, the offer software 148 also may be responsible for sending offer response and/or fulfillment data to the offer server 102 via a fulfillment path 116. Offer response or fulfillment data may be received or obtained by the offer software 148 from the content providing engine 150, directly from a user device 108, from a third-party merchant or seller device, or from any other device having such information.

Figure 8:
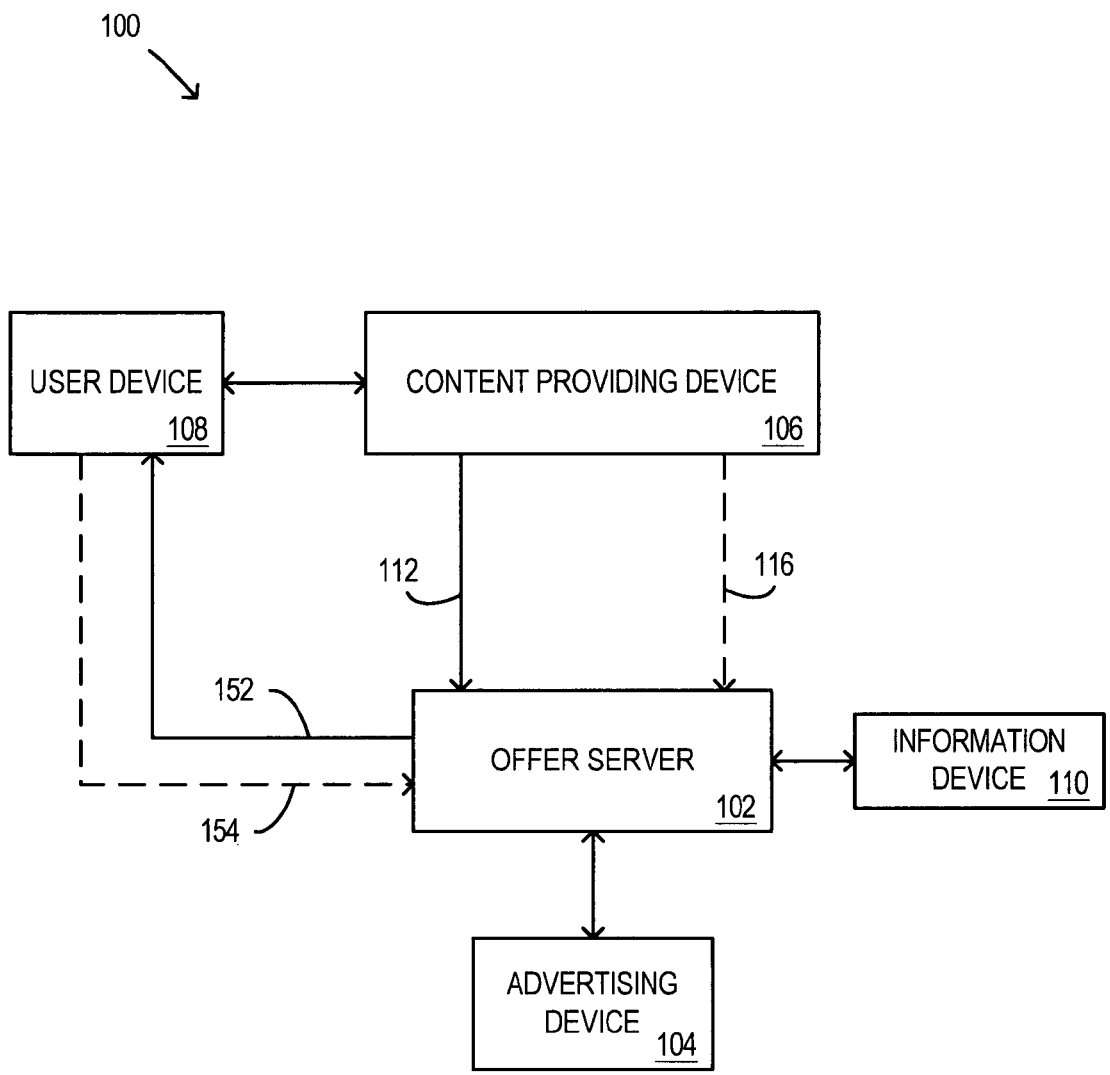
FIG. 8 is a block diagram of a system in accordance with some embodiments.

Referring now to FIG. 8, a block diagram of a system 100 in accordance with some embodiments is shown. In some situations it may not be desirable or possible for the offer server 102 to direct the content providing device 106 to serve selected offers. The content providing device 106, for example, may not be capable of displaying or serving offers, or may be prohibited from doing so. In such situations, the content providing device 106 may supply the offer server 102 with user information via an information path 112. Such information may be data indicative of information associated with a user as described herein. In some embodiments, the information includes at least one metric associated with the user and the user's e-mail address (or information usable to determine the user's e-mail address) or other contact information (e.g., instant messaging address). The offer server 102 may then select one or more offers in accordance with methods described herein, and may then send an e-mail to the user via e-mail path 152, the e-mail generally including the selected offer or offers.

The e-mail sent to the user may be in hyper text markup language (HTML) format or any other format available for sending e-mails. If the e-mail is in HTML format, than a web page containing the selected offers, in accordance with some embodiments described herein, may simply be inserted into the e-mail. Embedded controls may then be interacted with by the user to generate offer response or offer acceptance data, which may be transmitted to the offer server 102 via a response path 154. In some embodiments, the user may directly reply to the e-mail to the offer server 102 via response path 154. The response may include offer acceptance, payment, or inquiry information or requests, and may be used to both supply advertisers with offer reports and refine and update an offer scoring model. If it is not desirable or possible for a user to direct offer response data directly to the offer server 102, the content providing device 106 may provide such data via a fulfillment path 116. For example, an offer e-mail sent to a user from the offer server 102 may cause or require the user to communicate with a content providing device 106 in order to consummate an offer transaction or receive more detailed offer information (e.g., the offer e-mail may include a hyperlink to a content providing site). The content providing device 106 would then have access to information regarding the user's actions on the content providing site. This information could then be relayed over the fulfillment path 116 to the offer server 102. Offer server 102 could then utilize, process, or analyze the response data to improve consecutive targeting efforts.

Figure 9:
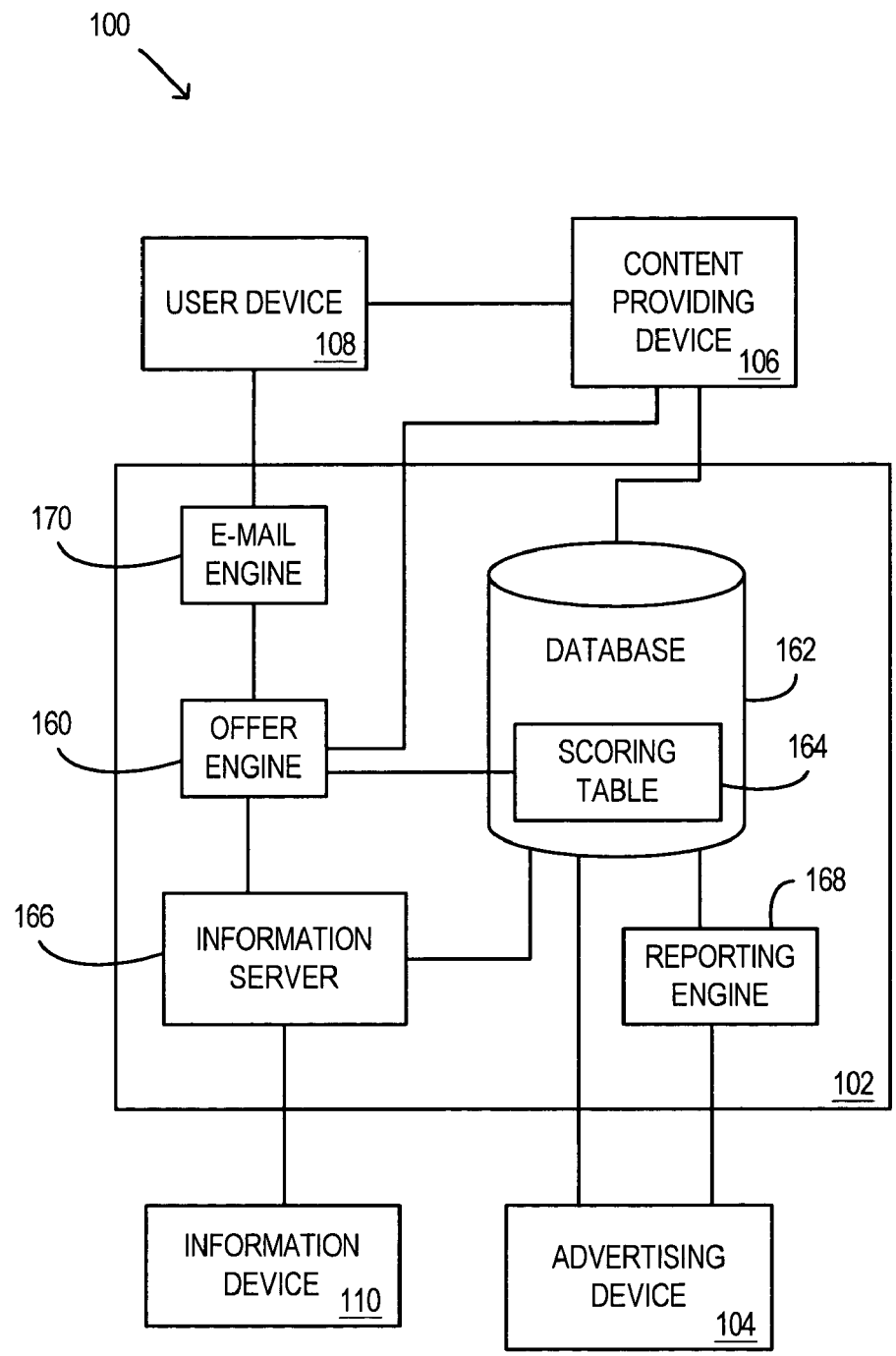
FIG. 9 is a block diagram of an apparatus and system in accordance with some embodiments.

Turning now to FIG. 9, a more detailed description of some embodiments of the targeted offer system 100 and the offer server 102, will be provided. In some embodiments, offer server 102 may include an offer engine 160. The offer engine 160 may be a PC, a server, a processor or processing unit, a program, a procedure, or any other device capable of performing mathematical and/or logical operations. Examples of possible offer engine configurations are described elsewhere herein. In some embodiments, the offer engine 160 performs the selecting of offers and/or the creating and updating of a targeted offer scoring model. The offer engine 160 may be connected to a database 162 that may be used to store a variety of information. The database 162, for example, may store user information, metric values, reporting information, response data, a plurality of offers, and/or one or more scoring tables 164. The scoring table 164 is used to select targeted offers from the plurality of offers, and is generally created by one or more scoring models.

The offer engine 160 may also be connected to an information server 166. The information server 166 may be a PC or other processing device similar to the possible configurations of the offer engine 160. According to some embodiments, the information server 166 may manage the communication of information to and from one or more information devices 110. The information server 166 may process or filter information and may transmit information to the offer engine 160 (e.g., for use in verification, correction, selection, and/or modeling procedures). The information server 166 may also store information directly in the database 162. In some embodiments, the information server 166 may settle payment and billing issues between the offer server 102 and one or more information devices 110. According to some embodiments, the information server 166 may be an information device 110.

Also connected to the database 162 is a reporting engine 168. The reporting engine 168 may be a PC, software, or firmware device or component similar to the possible configurations of the offer engine 160. The reporting device 168 may utilize data stored in the database 162 to provide reports to one or more advertising devices 104. Reports may include information on offers selected or served, offer response data, billing data, scoring data, and demographic data. The advertising devices 104 may themselves be directly connected to the database 162 to enable them to transmit offers to the offer server 102. In some embodiments, the reporting engine 168 may also create reports or reporting data to be used by the offer server 102 in conjunction with offer targeting analysis or procedures. Various reports may also be created and disseminated to any other device or combination of devices internal or external to the offer targeting system 100.

The offer engine 160 may also be connected to an e-mail engine 170. The e-mail engine 170 may also be any PC, software, or firmware device or component similar to the possible configurations of the offer engine 160. The e-mail engine 170 is used to send targeted offer e-mails directly to one or more user devices 108. In some embodiments, as described herein, the offers selected may be desired or required to be sent directly to a user. The e-mail engine 170 may compile, create, design, and/or transmit targeted offer e-mails. In some embodiments, the e-mail engine 170 may also receive e-mail responses from users. Processing and/or analysis of e-mail responses may also be conducted by the e-mail engine 170.

Figure 10:
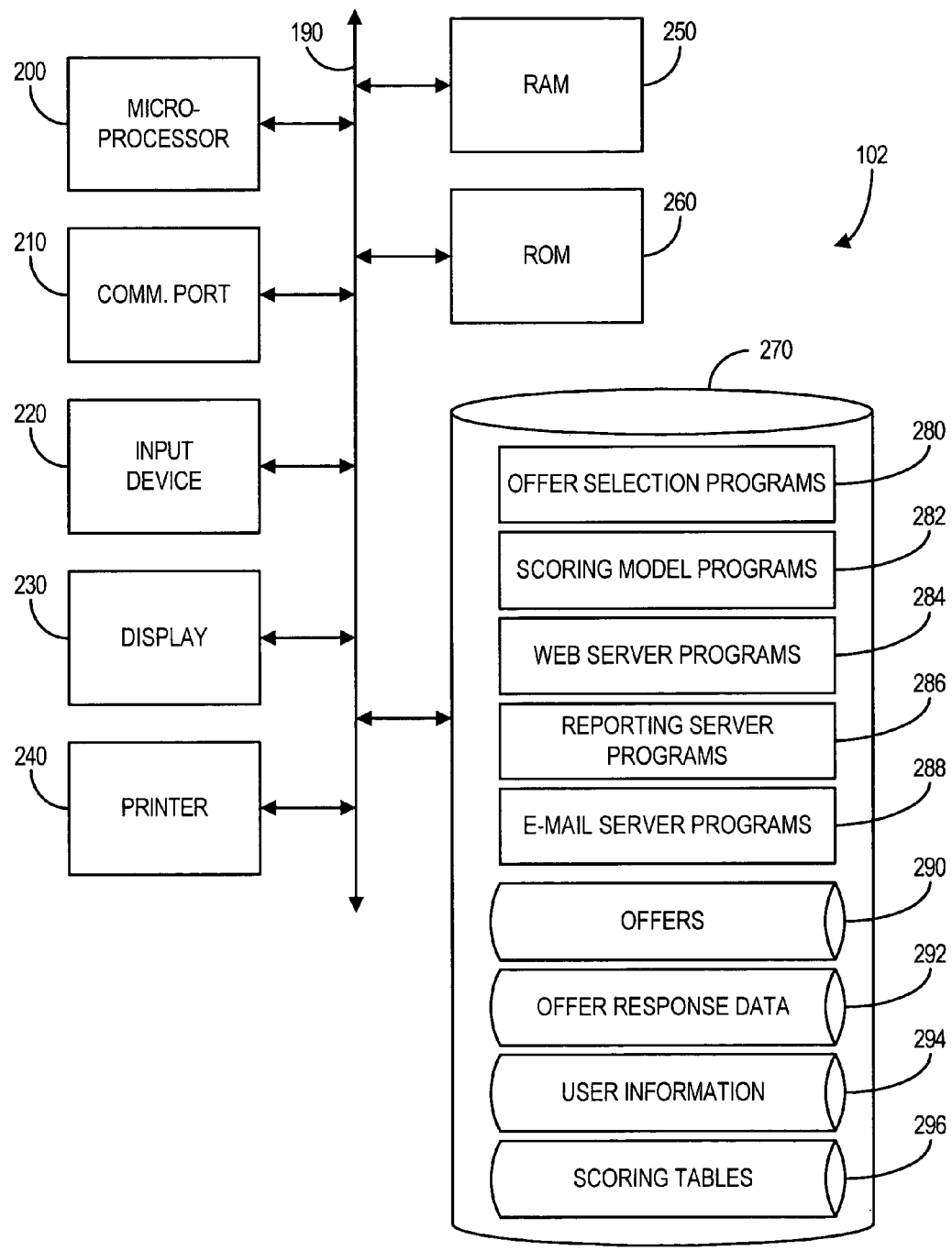
FIG. 10 is a block diagram of an apparatus in accordance with some embodiments.

Further details of one embodiment of an offer server 102 will now be briefly discussed by referring to FIG. 10, where a block diagram of one embodiment of an offer server 102 is shown. As depicted, offer server 102 is configured as a computing device programmed to operate pursuant to embodiments described herein. In some embodiments, the offer server 102 may be programmed, designed, or otherwise adapted to execute and/or perform methods for targeting one or more offers as described herein (i.e., as in conjunction with methods described in relation to FIGS. 3, 5, and 11). As depicted, offer server 102 includes a microprocessor 200 coupled to a system bus 190 to interact with other components including a communications port 210, one or more input devices 220, output devices including a display 230 and a printer 240, and storage devices including RAM 250, ROM 260 and mass storage device 270. According to some embodiments, the offer server 102 may include fewer or more components than described in accordance with and shown in FIG. 10, without deviating from the scope and purpose of the claimed embodiments.

Offer server 102 may communicate with other devices (such as advertising device 104, content providing device 106, user device 108, and information device 110) via communication port 210 coupled to various connections and/or networks. Offer server 102 may be configured as a Web server adapted to exchange information via the Internet or the like. According to some embodiments, offer server 102 communicates with other devices via a temporary computer communication channel (e.g., a path through which information can be exchanged). In other words, the communication channel between offer server 102 and another device (such as a user device 108) may be established and discontinued as appropriate. Note that an established communication channel does not need to be associated with a particular physical path. For example, offer server 102 may exchange information with a content providing device 106 via a Web site, in which case packets of information may be transmitted via various physical paths.

Mass storage device 270 of offer device 102 may store a number of different programs and data. For example, as shown, offer device 102 stores (or has access to) offer selection programs 280, scoring model programs 282, web server programs 284, reporting server programs 286, and e-mail server programs 288 which cause offer server 102 to perform offer selection, modeling, web serving, reporting, and e-mail functions. Data stored at (or accessible to) offer server 102 may include data such as offers 290, offer response data 292 (which may include offer fulfillment data received from one or more content providing devices 106 or user devices 108), user information 294, and scoring tables 296 (described in more detail herein).

As illustrated above, in some embodiments, an offer targeting system may include a processor, a communications port coupled to the processor and adapted to communicate with a plurality of network devices, and a storage device coupled to the processor and storing instructions adapted to be executed by the processor to receive data indicative of information associated with a user, determine a value of a metric associated with the user based on the data indicative of information associated with the user, verify the value of the metric associated with the user, select an offer from a plurality of offers based at least in part on the value of the metric, each of the plurality of offers having a score associated with the value of the metric, and provide data indicative of the selected offer. In other embodiments an offer targeting system may be adapted to generate for each of a plurality of values of a metric, scores associated with a plurality of offers, receive fulfillment data on at least one of the plurality of offers, and update at least one of the scores based on the fulfillment data. In still other embodiments, an offer targeting system may be adapted to receive a first signal, the first signal including data indicative of information associated with a user, select, based on the data indicative of information associated with the user, a plurality of offers for simultaneous display on a web page, and provide a second signal, the second signal including data indicative of the plurality of offers. In further embodiments, an offer targeting system may include a processor; a communication port coupled to said processor and adapted to communicate with a plurality of network devices; and a storage device coupled to said processor and storing instructions adapted to be executed by said processor to receive data indicative of information associated with a user; determine a value of a first metric associated with said user based on said data indicative of information associated with said user; verify said value of said first metric associated with said user; determine a value of a second metric based, at least in part, on said value of said first metric; select an offer from a plurality of offers based at least in part on said value of said second metric, each of said plurality of offers having a score associated with said value of said second metric; and provide data indicative of said selected offer.

Referring now to FIG. 11, a block diagram of an exemplary database table 300 in accordance with some embodiments is shown. The exemplary database table 300 includes columns for zip+4 codes 302, universal model ranks 304, "bill me" ranks 306, video offers probabilities 306, and video offers profit scores 310. As shown in FIG. 11, various ranks, probabilities, and/or scores are represented for each zip+4 code value 302. The ranks and scores are values representing the probabilities of different offer and/or offer types of being accepted by users from each zip+4 code. More details regarding the scores and the models used to create them are described below. In accordance with embodiments described herein, other metrics associated with a user (besides and/or in addition to zip+4 codes) may be similarly stored with respective scores in the same or different tables or databases. Multiple tables and/or databases may be used to store the information shown in FIG. 11, and fewer or more database columns and rows may be used in accordance with some embodiments. In some embodiments, only a single column representing the scoring values of a single scoring model is used for any given metric associated with a user. In other embodiments, a plurality of columns representing scoring models for various individual offers are used for a single metric. The data shown in FIG. 11 is presented for exemplary purposes only and those skilled in the art will recognize that various types and/or configurations of data may be stored in such a table 300 without deviating from the scope of the claimed embodiments.

Figure 12:
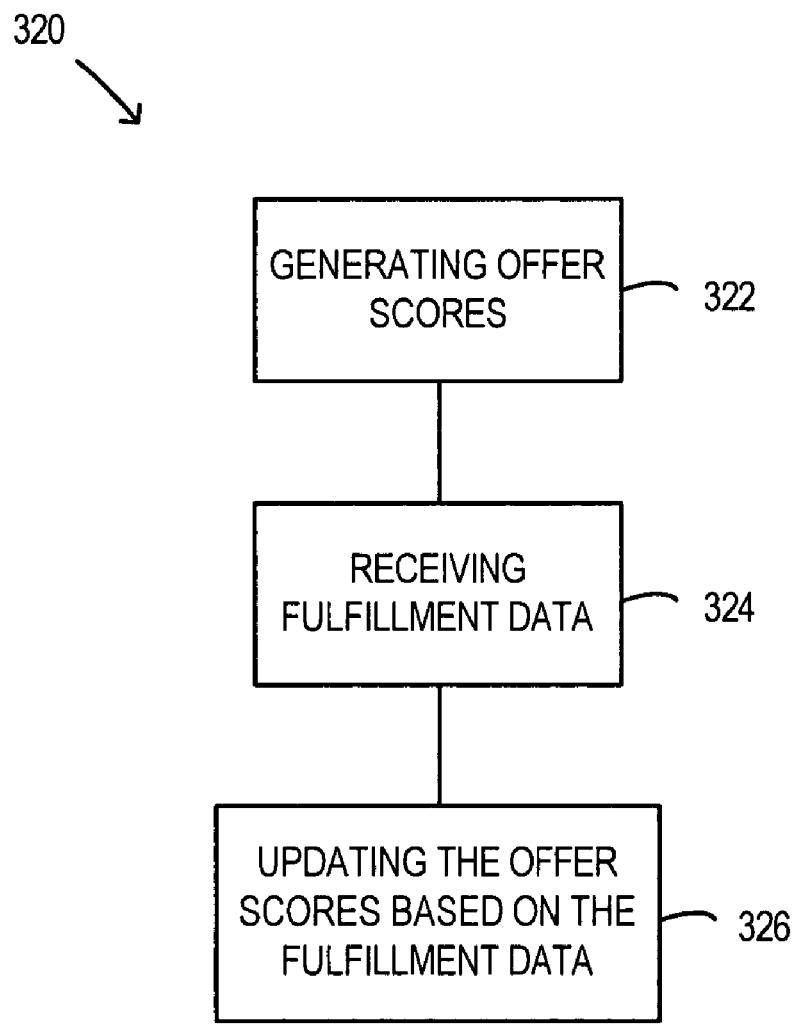
FIG. 12 is a method in accordance with some embodiments.

Turning now to FIG. 12, a method 320 in accordance with some embodiments is shown. At 322 the offer server 102 and/or a component of the offer server 102 such as the offer engine 160 (or the micro-processor 200) generates scores for offers. The offer scores may be generated using any known or available scoring model including one or more regression models. Regression models may be processed on one or more variables, metrics, or values to return statistical and probability scores. For example, a regression model may be run on multiple variables and/or data associated with one or more users to obtain scores or ranks aggregated by zip+4 codes. The regression model may be run on all offer data in general to develop a universal regression model, or may be run for specific offers or offer types to develop more specific and specialized regression models. Results from any one or multiple regression or other scoring models represent the probability of an offer or offer type being accepted or acted upon by a user. For example, using historical offer acceptance data for a soft drink offer, a regression model is run to provide scores for each known zip+4 code. The model is a statistical tool that correlates and/or normalizes the historical data and aggregates it by zip+4 code. From the correlated and/or normalized data, trends can be identified that may indicate certain or several zip+4 codes where the soft drink offer has often been or is likely to be accepted. Each zip+4 code is therefore assigned a probability-related score regarding the soft drink offer. The scores may then be used to increase soft drink offer acceptance rates by targeting soft drink offers to those zip+4 codes that are more likely to accept such offers. Those skilled in the art will recognize that regression data may be compiled for any number of variables and/or metrics including zip+4 codes, households, area codes, and individual users. In some embodiments, regression models compiled for various metrics may be used to create one or more "match codes" representing various degrees of regression model accuracy. For example, a regression model providing scores aggregated by zip+4 codes may be associated with a match code indicating that the model is highly accurate (i.e., for any given user an appropriate offer is likely to be targeted based on the regression scores). While a regression model for individual users may have a higher match code indicating a higher accuracy probability. These match codes represent the fact that the scoring model based on individual users is likely to be more accurate than the one based on zip+4 codes (e.g., members of the same zip+4 may have different interests, so an offer targeted to one such user may not actually be appropriate for a As shown in FIG. 11, the scoring table 300 contains columns for each regression model 304-310 and rows for each known value of zip+4 codes 302. For example, a universal model rank 304 is created for each zip+4 code 302 by running a zip+4 regression for all offers or offer types. The resulting scores shown in column 304 represent the probability rank or relative value of presenting an offer to a user from any given zip+4 code 302. Zip+4 code "262618799", for example, has a universal model rank 304 of ten. Assuming ranks are assigned based on values from one to ten, ten being the highest, zip+4 code "262618799" is a top-ranking zip+4 code 302. Offers served to a user from this zip+4 code 302 would therefore have a high probability of being accepted or acted upon. In comparison, zip+4 code "068420018" has a rank of two. Offers served to users from "068420018" would therefore have a much lower likelihood of being accepted then those served to "262618799" associated users. Those skilled in the art will realize that any available ranking scheme will comply with the objectives of present embodiments.

In some embodiments, the offer server 102 and/or one of its components may select an offer based on such universal model ranks 304. In such embodiments, only users from zip+4 codes ranking above a certain threshold level will be shown offers. In this way the probability of having a served offer accepted is increased. Offers may also be selected based on other regression models 306-310 and/or an average or combination of regression models 304-310. For example, column 306 shows regression ranks for zip+4 codes based on an offer class-specific regression model. The regression model is run for only "bill me"-type offers. The resulting ranks 306 indicate the relative probability of a "bill me" offer being accepted in the various zip+4 codes 302. The various zip+4 codes 302 may have identical rank scores for the different ranking models 304-306 (as shown for zip+4 code "262618799"), or the ranks may differ from model to model (as shown for all other represented zip+4 codes 302).

Offer selection may be based solely on either the universal model rank 304 or the "bill me" rank 306. Offers may also be selected based on an average of the two model ranks 304, 306 or may be selected using any other form of mathematical or logical processing and selection. In some embodiments, "bill me" offers are selected based on the "bill me" ranks 306, while other offers may be selected based on the universal model ranks 304. As the regression model is made more specific, the probability that a served offer will be accepted generally increases. Thus, "bill me" offers served using "bill me" regression ranks 306 will be more likely to be accepted than any type of offer served using a universal model rank 304.

Use of a more targeted regression model will thus generally increase the effectiveness of an offer serving campaign. For example, zip+4 code "210320291" has a universal model rank 304 of five and a "bill me" rank 306 of six. If a business decision is made to only serve ads to zip+4 codes 302 with ranks higher than five, than users from zip+4 code "210320291" will not receive offers under the universal regression model, but will under the "bill me" regression model. If the offer to be served is a "bill me" offer, then users from the zip+4 code "210320291" would qualify for the offer when the more specific model is applied. Thus, the more specific model allows offers to be targeted to users that have a good probability of accepting a specific offer type, but who would normally not be served offers in the absence of the more specific model. Similarly, some zip+4 codes 302 (like "068400001") may be served an offer under the universal model when they do not qualify under the more specific model. Manipulation and/or management of the various model scores and models allow the offer server 102 to greatly increase the effectiveness of each offer to be served.

Other scoring models may provide actual probabilities of an offer being accepted in a given zip+4 code 302. For example, the video offers probabilities 308 indicate that certain zip+4 codes 302 (like "262618799" with a 93% chance) are much more likely to accept video-related offers than others (like "001835574" with a 4% chance). Offers may be selected in similar fashion as that described for other models herein. In some embodiments, probability scores allow an advertiser or merchant (or the offer server 102) to choose a specific probability percentage point as a threshold. Simple reports may provide percentage point break-downs of revenue realized, revenue missed, or number or percentage of users targeted. Threshold levels may then be chosen to increase offer exposure, revenue, or acceptance rates while decreasing (in relative terms) marketing expenditures.

According to some embodiments, one or more offers may be selected based on a profit score. Although a profit score may be defined in several ways, one representative example will be described herein to clarify the general method of determining such a value. For example, a profit score may simply be the probability of an offer being accepted multiplied by the revenue associated with that given offer. For example, the video probability rank of 93% for zip+4 "262618799" in FIG. 11 multiplied by an offer revenue of $0.72 (not shown), for example, yields a video profit score 310 of $0.67. Offers may therefore be selected based on a probability-weighted revenue value, or profit score, to increase the amount of revenue obtained through offer targeting.

The revenue component of a profit score may represent several different values. In some embodiments, the offer revenue may represent the amount of revenue expected by an advertiser or merchant upon offer acceptance (e.g., a margin or profit). The offer revenue may also indicate the amount of money an advertiser or merchant is willing to pay to have an offer served. Thus, the profit score may represent a revenue optimization from the perspectives of various involved parties including operators of the offer server 102 and of advertising devices 104. Offers may also be selected based on any number of other criteria, scores, or rankings related to, for example, advertiser campaign goals, offer server 102 goals, and/or content provider policies, goals, or objectives. Those skilled in the art will also appreciate that scoring models may be run for multiple offers (or even every available offer) to provide an offer-specific score for each metric value. In some embodiments, one or more offers may be selected based on the type of user device 108. For example, different offers may be selected for users of wireless telephone user devices 108 than for personal digital assistant (PDA) user devices 108.

Returning now to FIG. 12, fulfillment data is received at 324 by the offer server 102. The data may be received according to methods described herein, or may arrive by any other manner from any number of possible data sources. In some embodiments, the fulfillment data pertains to one or more of the offers that were scored and/or ranked at 322. The fulfillment data may contain data regarding accepted offers and data regarding any other actions or inactions associated with an offer, offers, or offer type or types. The fulfillment data is then used at 326 to update the scoring model and the respective offer scores. In this manner, the targeted offer scores are intermittently or continually updated to reflect the most current probabilities based on the most current offer response and/or fulfillment data. As described herein, such updating may be accomplished in real-time to enable each system user to be targeted with a timely and appropriate offer. In some embodiments, fulfillment data may be received from multiple sources such as from several content providing devices 106. Such data collected from many sources may be utilized to create and/or update one or more scoring models for targeting offers. Multi-source scoring models may be more accurate, in some embodiments, because they take into account data from various sources. Generally, the accuracy of a model increases as the amount of data and the amount of data sources used increases.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means, or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention. The invention described in the above detailed description is not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method, comprising:

receiving at a server computer system from a user computer system at least one signal indicative of information associated with a user;

determining at the server computer system a value of a metric associated with said user based on said at least one signal indicative of information associated with said user;

verifying at the server computer system said value of said metric associated with said user;

selecting a first offer from a plurality of offers based at least in part on said value of said metric, each of said plurality of offers having a score associated with said value of said metric;

selecting a second offer from said plurality of offers based at least in part on said value of said metric, wherein said score of said second offer is lower than said score of said first offer;

transmitting from the server computer system at least one signal indicative of said selected first and second offers such that said first and second offers are simultaneously displayed to said user in a tiered fashion such that said first offer is displayed in a first tier and said second offer is displayed in a second tier, said signal including a first fulfillment path for responding to said first offer and a second fulfillment path for responding to said second offer;

storing a value of a metric in response to said user utilizing at least one of said first and second fulfillment paths; and updating the score associated with at least one of the selected first and second offers in response to said user utilizing said fulfillment path.

2. A method according to claim 1, further comprising: receiving at the server computer system at least one response signal associated with said selected offer.

3. A method according to claim 2, further comprising: generating at the server computer system a report on said selected offer, said report including said response data.

4. A method according to claim 1, further comprising: generating at the server computer system scores for a plurality of offers based on said value of said metric associated with said user.

5. A method according to claim 4, further comprising: creating at the server computer system at least one table of scores for said plurality of offers for a plurality of said values of said metric associated with said user.

6. A method according to claim 4, further comprising: updating at the server computer system said scores based on offer response data.

7. A method according to claim 1, further comprising: receiving at the user computer system said at least one signal indicative of said selected offer.

8. A method according to claim 7, wherein said receiving said at least one signal indicative of said selected offer includes receiving said at least one signal indicative of said selected offer from a content providing device.

9. A method according to claim 7, wherein said receiving said at least one signal indicative of said selected offer includes receiving said at least one signal indicative of said selected offer from a content advertising device.

10. A method according to claim 1, wherein said receiving said at least one signal indicative of information associated with said user includes receiving at an offer server said at least one signal indicative of information associated with said user from a content providing device.

11. A method according to claim 1, wherein said receiving said at least one signal indicative of information associated with said user includes receiving at the server computer system said at least one signal indicative of information associated with said user from a user device.

12. A method according to claim 1, wherein said determining said value of said metric includes: determining at the server computer system a zip+4 code associated with said user based on said at least one signal indicative of information associated with said user.

13. A method according to claim 1, wherein verifying that said value of said metric associated with said user is valid includes: comparing at the server computer system said value of said metric associated with said user to at least one known value of said metric.

14. A method according to claim 1, wherein verifying that said value of said metric associated with said user is valid includes: receiving at an offer server at least one signal associated with said value of said metric from an information device.

15. A method according to claim 1, wherein verifying said value of said metric associated with said user includes: correcting at the server computer system said value of said metric associated with said user.

16. A method according to claim 1, wherein said selecting an offer from said plurality of offers includes: selecting at the server computer system at least one offer type based at least in part on a score of said at least one offer type associated with said value of said metric.

17. A method according to claim 16, wherein said selecting an offer from said plurality of offers includes: selecting at the server computer system at least one offer from said selected at least one offer type.

18. A method according to claim 1, wherein said selecting an offer from said plurality of offers includes: selecting at the server computer system multiple offers from said plurality of offers.

19. A method according to claim 18, wherein said multiple offers are selected for simultaneous display on a web page.

20. A method according to claim 18, wherein said selecting multiple offers from said plurality of offers includes: selecting at the server computer system at least one primary offer; and selecting at the server computer system at least one secondary offer.

21. A method according to claim 20, wherein said at least one primary offer is selected based at least in part on said score associated with said value of said metric.

22. A method according to claim 21, wherein said at least one secondary offer is selected based at least in part on said score associated with said value of said metric.

23. A method according to claim 1, wherein said transmitting at least one signal indicative of said selected offer includes: transmitting at least one signal indicative of said selected offer from an offer sever to at least one content providing device.

24. A method according to claim 1, wherein said transmitting at least one signal indicative of said selected offer includes: transmitting at least one signal indicative of said selected offer from the server computer system to at least one user device.

25. A method according to claim 1, wherein said at least one signal indicative of said selected offer includes an offer code associated with said selected offer.

26. A method according to claim 1, wherein said metric is a first metric and said verifying of said value of said metric associated with said user includes: determining at the server computer system at least one value of a second metric associated with said user; and determining at the server computer system a correct value of said first metric based at least in part on said value of said second metric.

27. A method according to claim 1, wherein said score is a profit score.

28. A method according to claim 1, wherein said transmitting said at least one signal indicative of said selected offer includes: transmitting from the server computer system said at least one signal providing-said-data indicative of said selected offer on a web page.

29. A method according to claim 1, wherein transmitting said at least one signal indicative of said selected offer includes: transmitting from the server computer system said at least one signal indicative of said selected offer in an e-mail message.

30. An article of manufacture comprising:
a computer readable medium having stored thereon instructions which, when executed by a processor, cause said processor to:

receive data indicative of information associated with a user;

determine a value of a metric associated with said user based on said data indicative of information associated with said user;

verify said value of said metric associated with said user;

select a first offer from a plurality of offers based at least in part on said value of said metric, each of said plurality of offers having a score associated with said value of said metric;

select a second offer from said plurality of offers based at least in part on said value of said metric, wherein said score of said second offer is lower than said score of said first offer;

transmit at least one signal indicative of said selected first and second offers such that said first and second offers are simultaneously displayed to said user in a tiered fashion such that said first offer is displayed in a first tier and said second offer is displayed in a second tier, said signal including a first fulfillment path for responding to said first offer and a second fulfillment path for responding to said second offer;

storing a value of a metric in response to said user utilizing at least one of said first and second fulfillment paths; and updating the score associated with at least one of the selected first and second offers in response to said user utilizing said fulfillment path.

31. An article of manufacture according to claim 30, wherein said stored instructions, when executed by a processor, further cause said processor to: receive response data associated with said selected offer.

32. An article of manufacture according to claim 30, wherein said stored instructions, when executed by a processor, further cause said processor to: generate scores for a plurality of offers based on said value of said metric associated with said user.

33. An article of manufacture according to claim 30, wherein said offer is selected from said plurality of offers by: selecting at least one offer type based at least in part on a score of said at least one offer type associated with said value of said metric.

34. An article of manufacture according to claim 30, wherein said offer is selected from said plurality of offers by: selecting multiple offers from said plurality of offers.

35. An article of manufacture according to claim 34, wherein said selecting multiple offers from said plurality of offers includes: selecting at least one primary offer; and selecting at least one secondary offer.

36. An offer targeting system, comprising:

a processor; a communication port coupled to said processor and adapted to communicate with a plurality of network devices; and a storage device coupled to said processor and storing instructions adapted to be executed by said processor to:

receive data indicative of information associated with a user;

determine a value of a metric associated with said user based on said data indicative of information associated with said user;

verify said value of said metric associated with said user;

select a first offer from a plurality of offers based at least in part on said value of said metric, each of said plurality of offers having a score associated with said value of said metric;

select a second offer from said plurality of offers based at least in part on said value of said metric, wherein said score of said second offer is lower than said score of said first offer;

transmit at least one signal indicative of said selected first and second offers such that said first and second offers are simultaneously displayed to said user in a tiered fashion such that said first offer is displayed in a first tier and said second offer is displayed in a second tier, said signal including a first fulfillment path for responding to said first offer and a second fulfillment path for responding to said second offer;

storing a value of a metric in response to said user utilizing at least one of said first and second fulfillment paths; and updating the score associated with at least one of the selected first and second offers in response to said user utilizing said fulfillment path.

* * * * *